United States Patent
Brokmann

(10) Patent No.: US 6,340,442 B1
(45) Date of Patent: Jan. 22, 2002

(54) METHOD AND APPARATUS FOR PRODUCING MOLDED TUBULAR OBJECTS FROM POLYMER CONCRETE

(75) Inventor: Manfred Brokmann, Osnabrueck (DE)

(73) Assignee: iloma Automatisierungstechnik GmbH, Osnabrueck (DE)

( * ) Notice: Subject to any disclaimer, the term of this patent is extended or adjusted under 35 U.S.C. 154(b) by 0 days.

(21) Appl. No.: 08/776,633

(22) PCT Filed: Sep. 11, 1995

(86) PCT No.: PCT/EP95/03570
§ 371 Date: Mar. 28, 1997
§ 102(e) Date: Mar. 28, 1997

(87) PCT Pub. No.: WO96/07531
PCT Pub. Date: Mar. 14, 1996

(30) Foreign Application Priority Data

Sep. 10, 1994 (DE) .......................................... 44 32 333

(51) Int. Cl.[7] .......................... B28B 21/20; B28B 7/14; B28B 21/06; B28B 21/14; B28B 21/16
(52) U.S. Cl. .......................... 264/426; 264/33; 264/71; 264/72; 264/308; 264/489; 264/138; 264/161; 264/256; 264/255; 264/266; 264/269; 264/333; 264/511; 425/174.8 R; 425/122; 425/127; 425/224; 425/289; 425/306; 425/424; 425/426; 425/427; 425/432
(58) Field of Search .......................... 264/70, 71, 256, 264/426, 489, 255, 72, 138, 161, 333, 266, 269, 511, 33, 308; 425/424, 426, 427, 432, 174.8 R, 224, 306, 289, 117, 122, 127

(56) References Cited

U.S. PATENT DOCUMENTS

| | | | | |
|---|---|---|---|---|
| 2,614,312 A | * | 10/1952 | Rankin et al. | 264/426 |
| 2,786,252 A | * | 3/1957 | Curran | 425/113 |
| 2,789,334 A | * | 4/1957 | Webb | |
| 3,047,929 A | * | 8/1962 | Steiro | 264/426 |
| 3,551,967 A | * | 1/1971 | Williams | 264/426 |
| 3,696,182 A | * | 10/1972 | Joelson | 264/72 |
| 3,796,407 A | * | 3/1974 | Brown | 249/63 |
| 3,992,503 A | * | 11/1976 | Henfrey et al. | 264/167 |
| 4,044,088 A | * | 8/1977 | Hume | 264/130 |
| 4,687,374 A | * | 8/1987 | Babenderende et al. | 264/426 |
| 4,710,115 A | * | 12/1987 | Tucker et al. | 425/117 |
| 4,758,397 A | * | 7/1988 | Schreiner et al. | 264/166 |
| 4,789,267 A | * | 12/1988 | Babendererde et al. | 264/426 |
| 5,040,968 A | * | 8/1991 | Kraiss | 425/426 |
| 5,891,384 A | * | 4/1999 | Miyajima | 264/511 |

FOREIGN PATENT DOCUMENTS

| | | | | |
|---|---|---|---|---|
| DE | 43 39 118 | * | 6/1995 | |
| SU | 353935 | * | 10/1972 | 264/426 |
| WO | WO 87/01632 | * | 3/1987 | B22D/11/10 |

* cited by examiner

Primary Examiner—Jan H. Silbaugh
Assistant Examiner—Michael I. Poe
(74) Attorney, Agent, or Firm—Jordan and Hamburg LLP

(57) ABSTRACT

A method and apparatus for producing tubular molded products from molding material includes a mold casing and a mold core having a common longitudinal central axis which is vertically disposed. The mold casing and mold core are spaced from one another to define a molding space therebetween. A supply device supplies molding material from above the molding space into the molding space. Treatment apparatus is disposed at treatment zones on the mold core for treating the molding material in the molding space, the treatment including treating the molding material by shaking the molding material or treating the molding material by heating the molding material, or both. The mold casing has an axial length which is less than an axial length of the molded product, to be produced and apparatus is provided for lowering a lower end of the column of molding material in the molding space in a direction parallel to the central axis from an initial position to a lowered position which enables production of a molded product of a desired longitudinal length.

55 Claims, 17 Drawing Sheets

Figure 1:
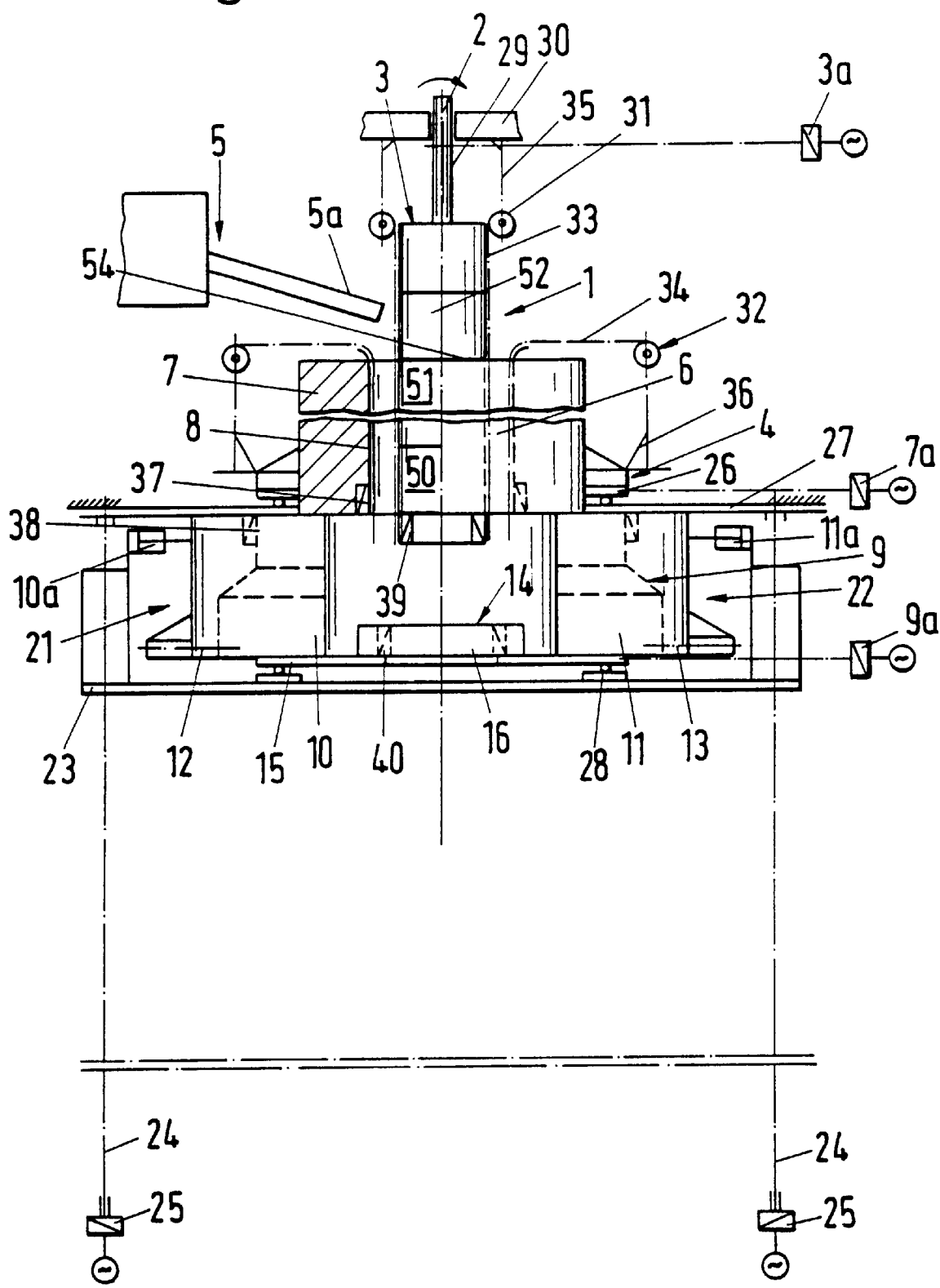

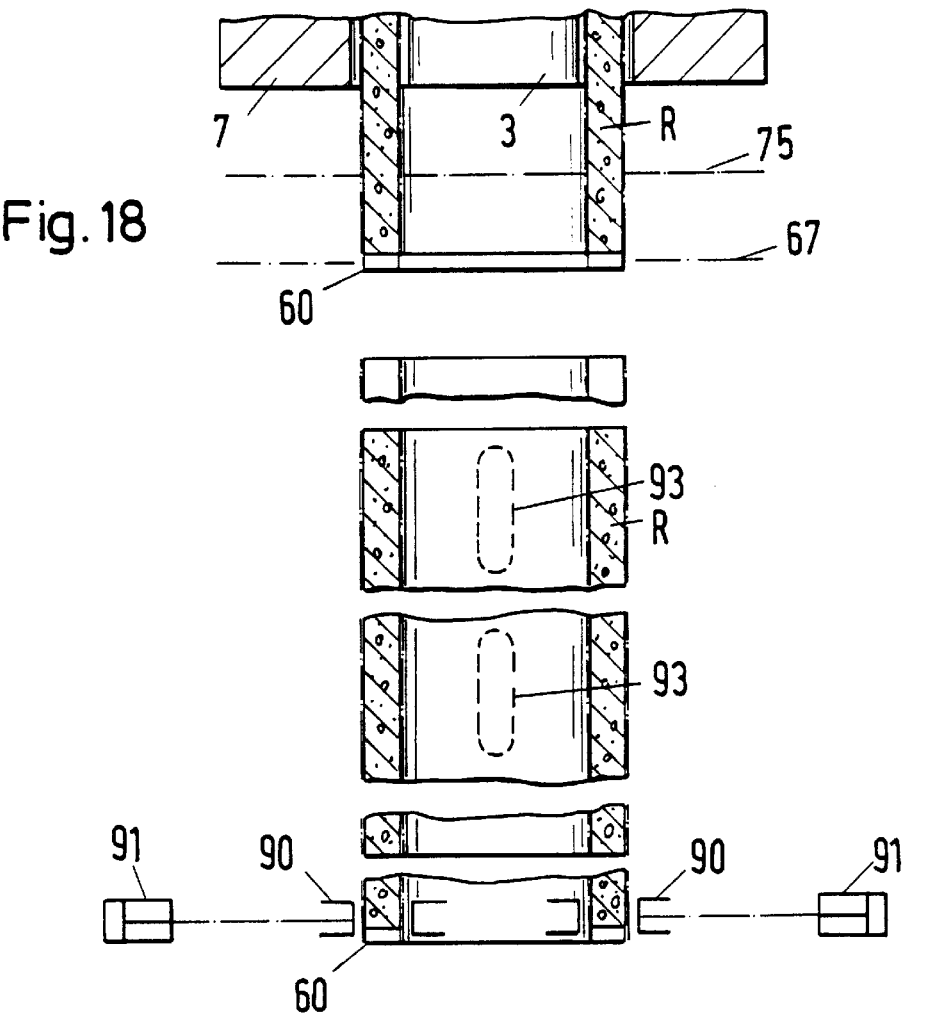
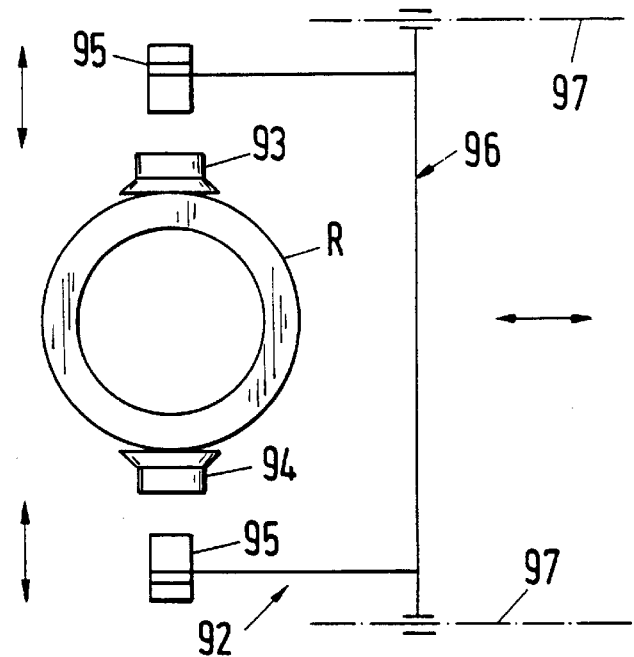

METHOD AND APPARATUS FOR PRODUCING MOLDED TUBULAR OBJECTS FROM POLYMER CONCRETE

BACKGROUND OF THE INVENTION

The invention relates to a method and an apparatus for producing pipes or similar tubular molded objects from polymer concrete. The invention furthermore relates to a polymer concrete socket pipe.

In practice, for the production of pipes from polymer concrete, molding equipment is used, which consists of a mold core and a mold casing, which together form the boundary of a molding space. The molding space of the molding equipment, the main axis of which is aligned vertically, is filled with a mineral casting composition by means of filling equipment and this mineral casting composition is subsequently shaken as a whole. Sometime after the end of the shaking process, the mineral casting composition, which is at ambient temperature, commences to cure. After the curing process is largely concluded, the molding equipment casing is removed from the molded object. Since the pipe shrinks as it cures and, during the slow course of the curing process, the casing cannot be removed from the pipe before considerable shrinkage occurs, a sleeve-like compensating body, which then lines the finished pipe as a liner, must be placed on the mold core.

In the case of a method of an older proposal (P 43 39 118.4), the molded object is built up sectionwise along its central axis by filling consecutive longitudinal sections of the molding space of the molding equipment with mineral casting composition and shaking the mineral casting composition in the filling region and is cured sectionally phase-offset in the same direction. For this purpose, the molding equipment has a mold casing of superimposed, transposable casing segments, the segment parts of which in each case can be moved apart from an annular, closed operating position into nonoperative position and transposed in this position. The mold core is divided into axially limited sections, which form different treatment zones, it being possible to move the mold casing and mold core relative to one another in the axial direction during the production of a molded object.

SUMMARY OF THE INVENTION

It is an object of the invention to provide a method and an apparatus for producing molded objects, particularly a socket pipe, from polymer concrete. The method and apparatus are to enable tubular molded objects to be produced from polymer concrete with little operational and structural expense.

The invention enables pipes and tubular molded objects to be produced with a continuous or quasi continuous formation of the molded object in a molding space, which is stationary at least in the main part and which is traversed by the column of mineral casting composition. At the same time, the column of material is molded, solidified and cured. The structural expense of the molding equipment is exceedingly low, so that advantageous operating processes as well as simple retrofitting possibilities arise for the production of molded objects of different dimensions.

Further advantages and details of the invention arise out of the following description and the drawing, in which two examples of inventive molding equipment are shown diagrammatically.

Figure 2:
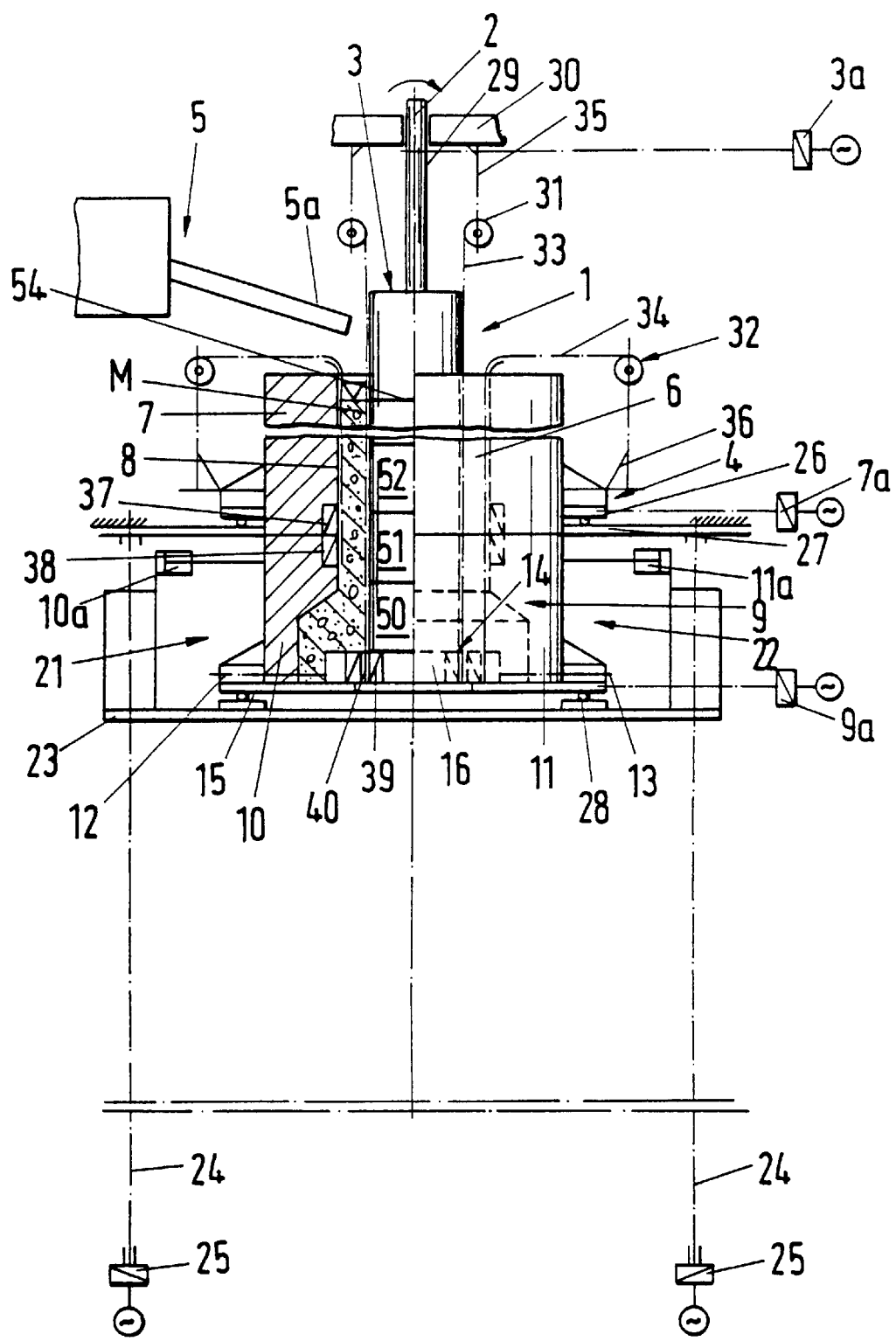
Figure 3:
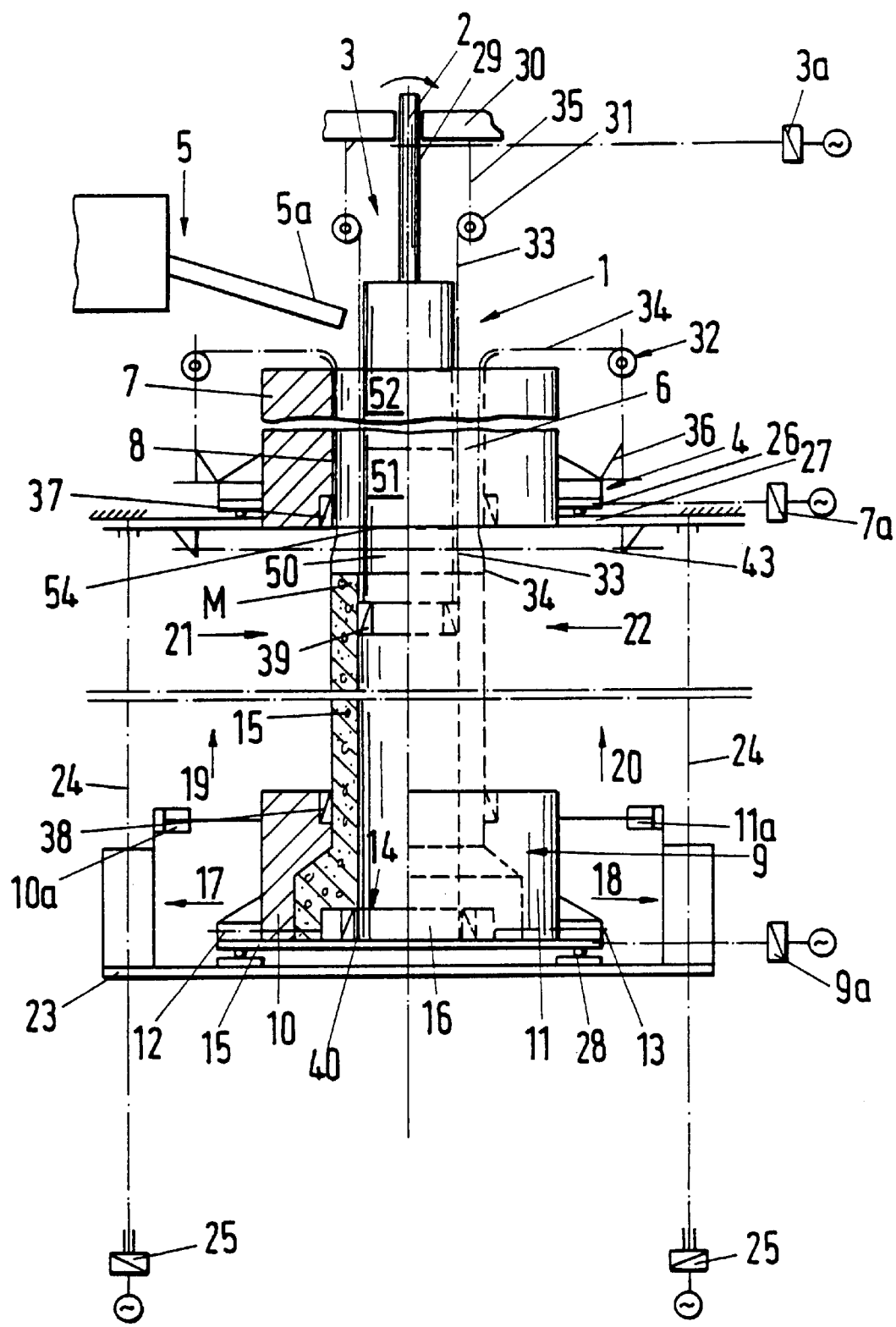
Figure 5:
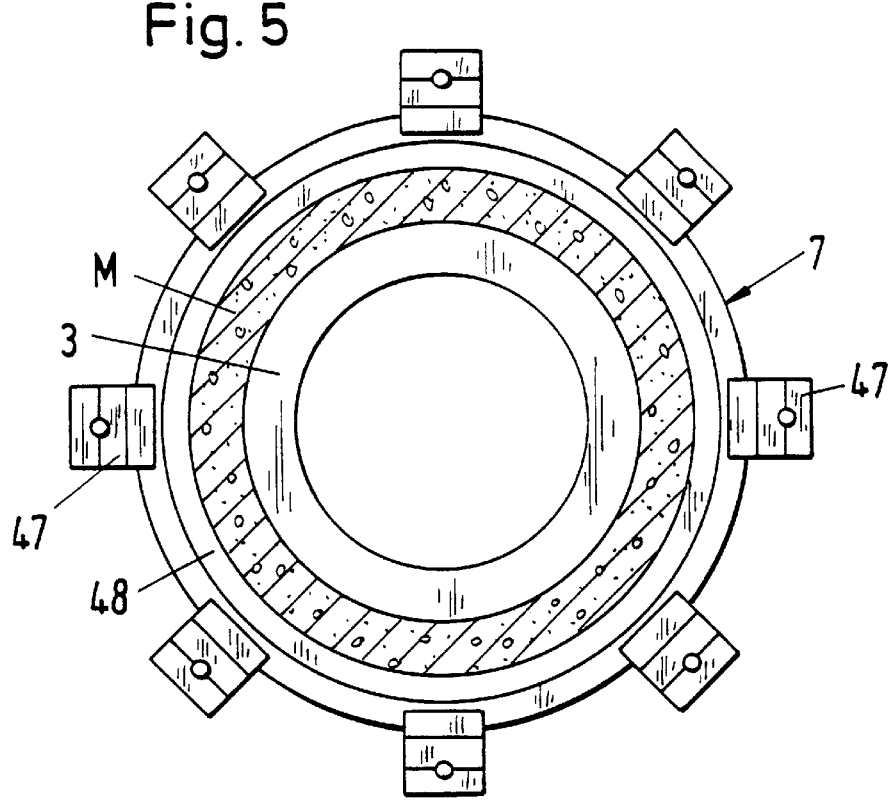
Figure 4:
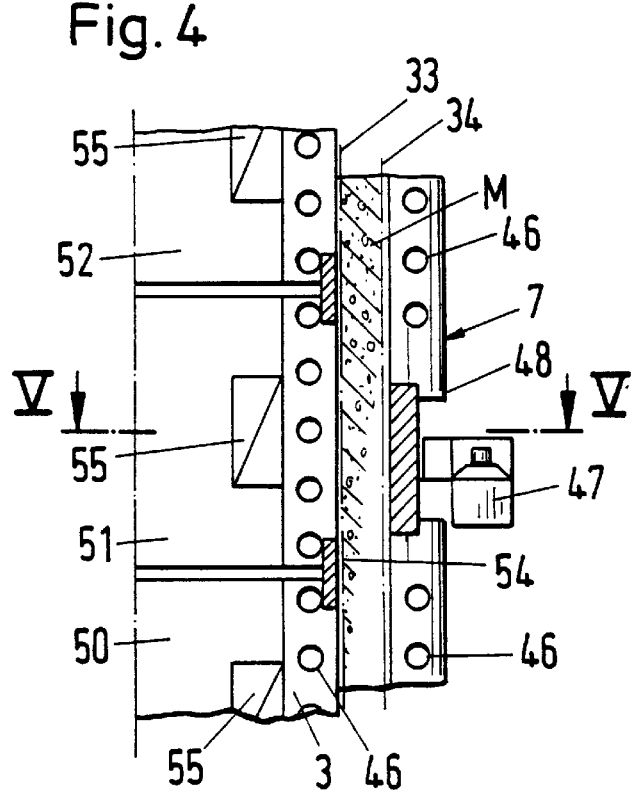
Figure 6:
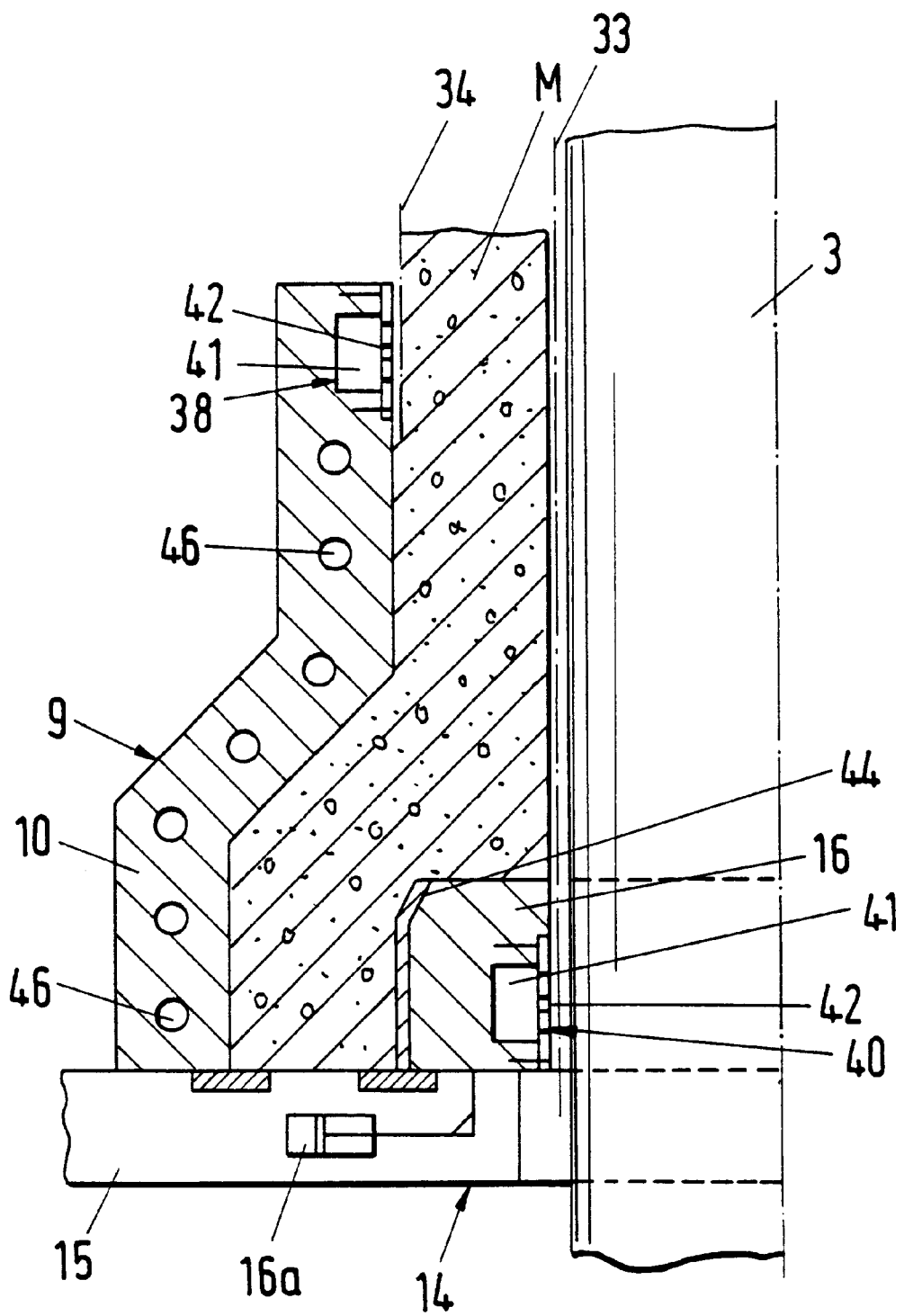
Figure 7:
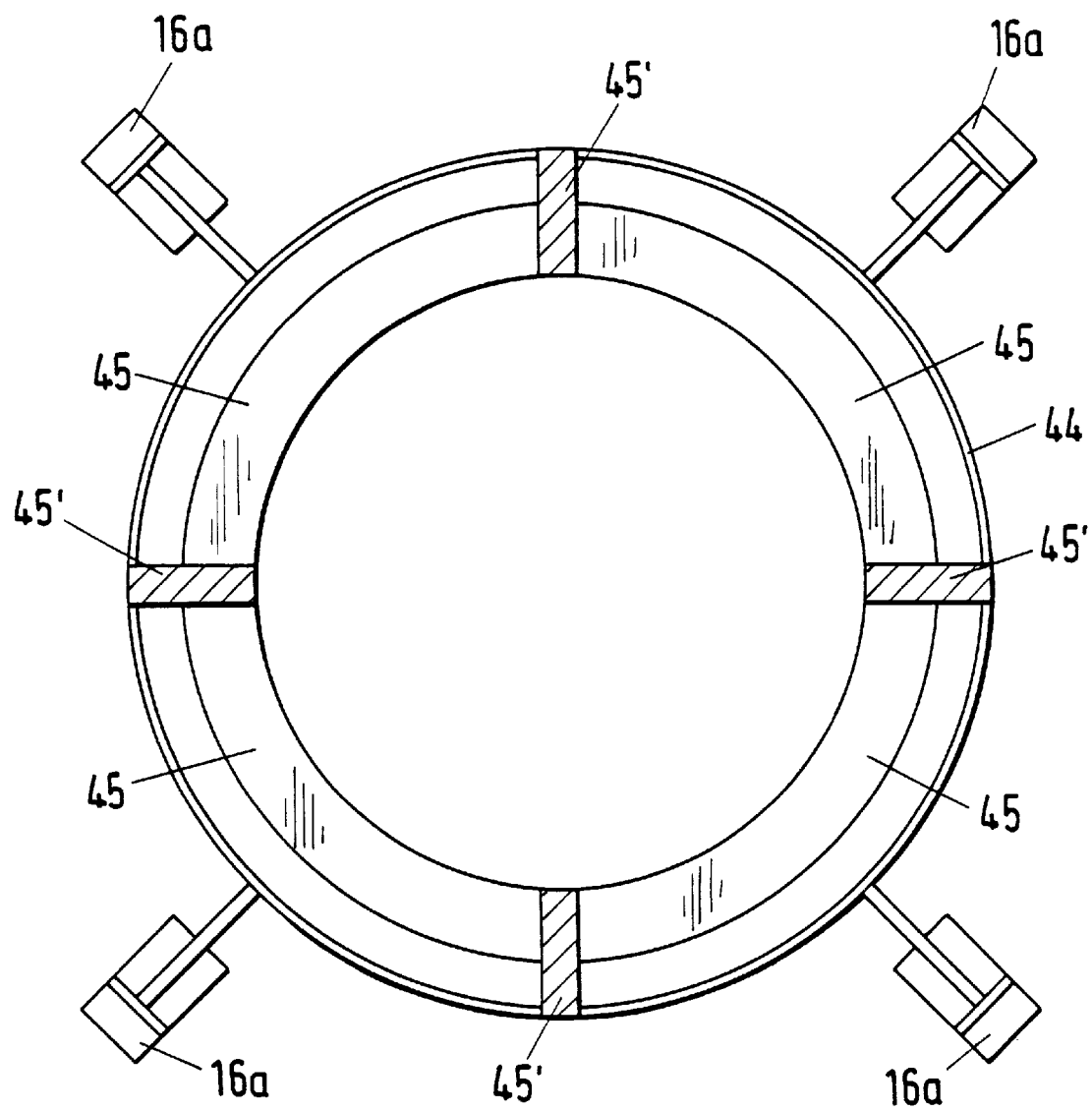
Figure 8:
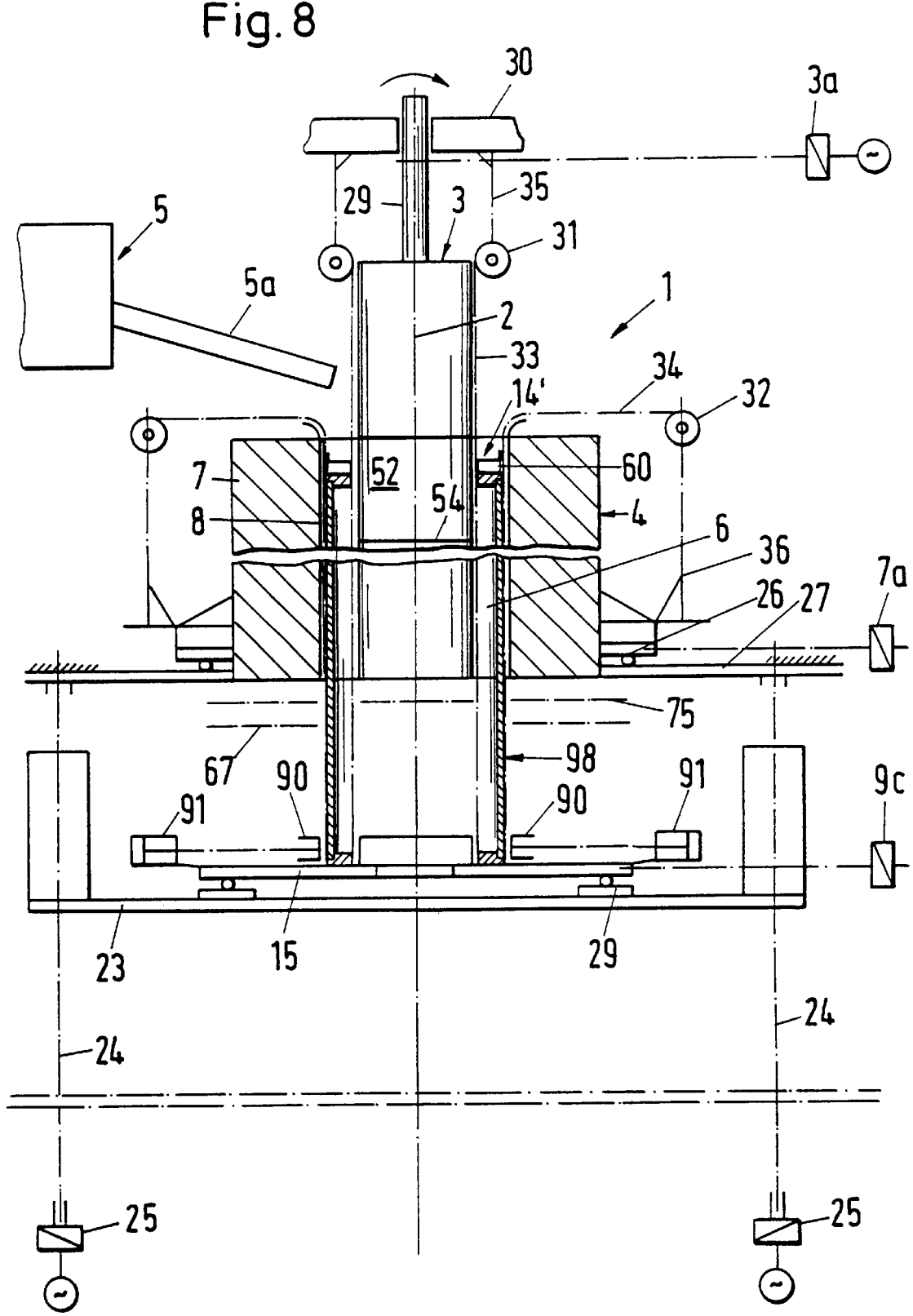
Figure 9:
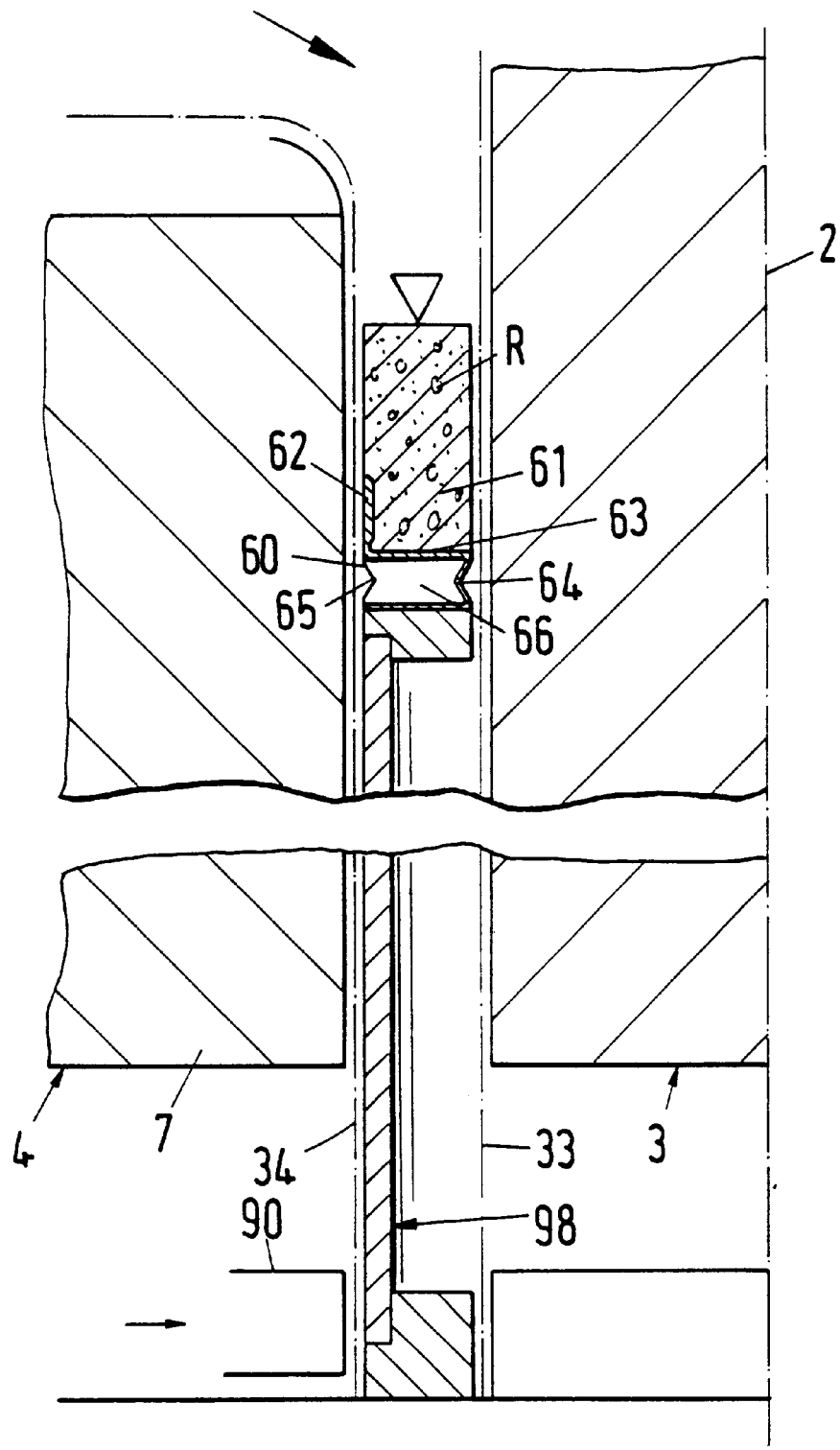
Figure 10:
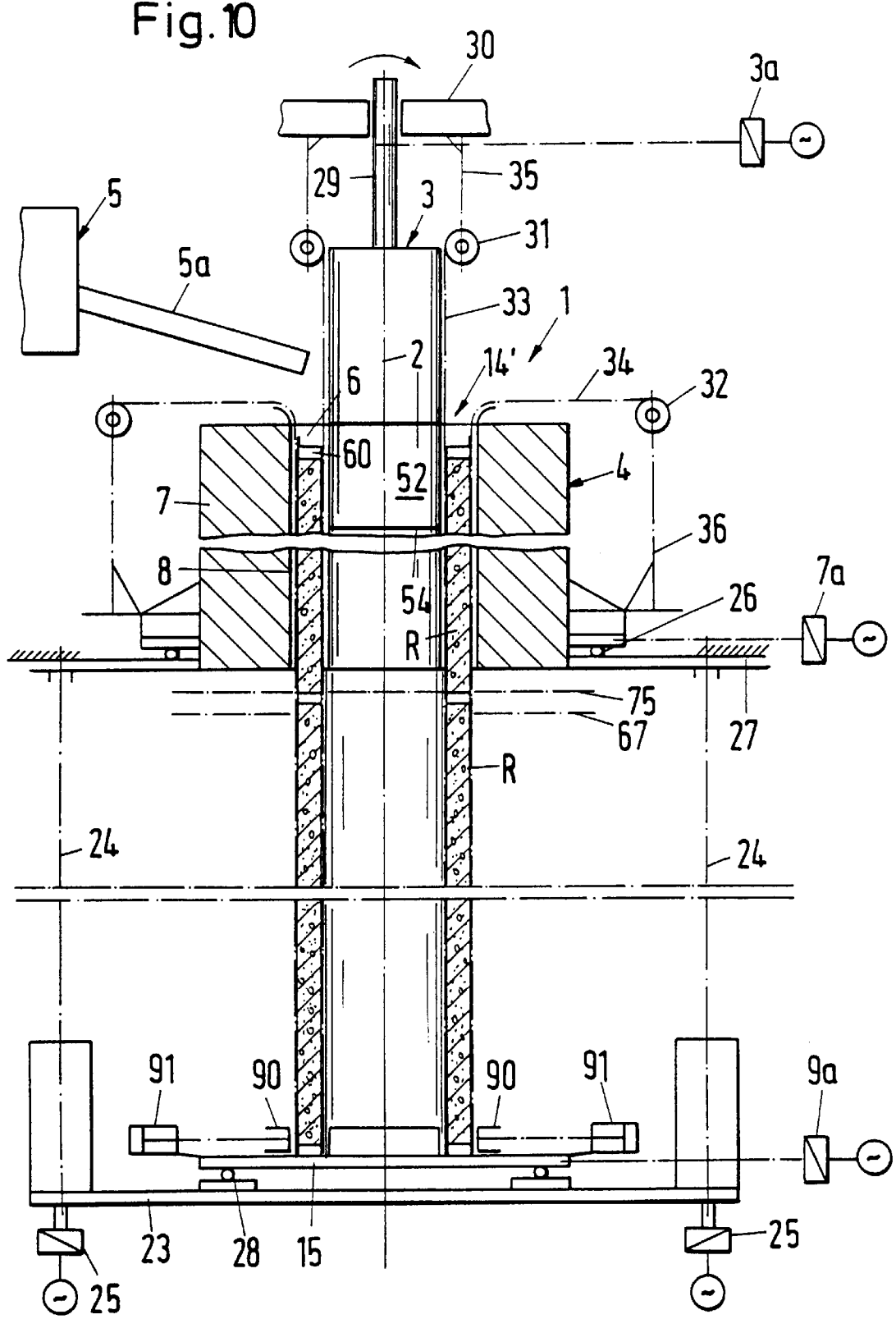
Figure 11:
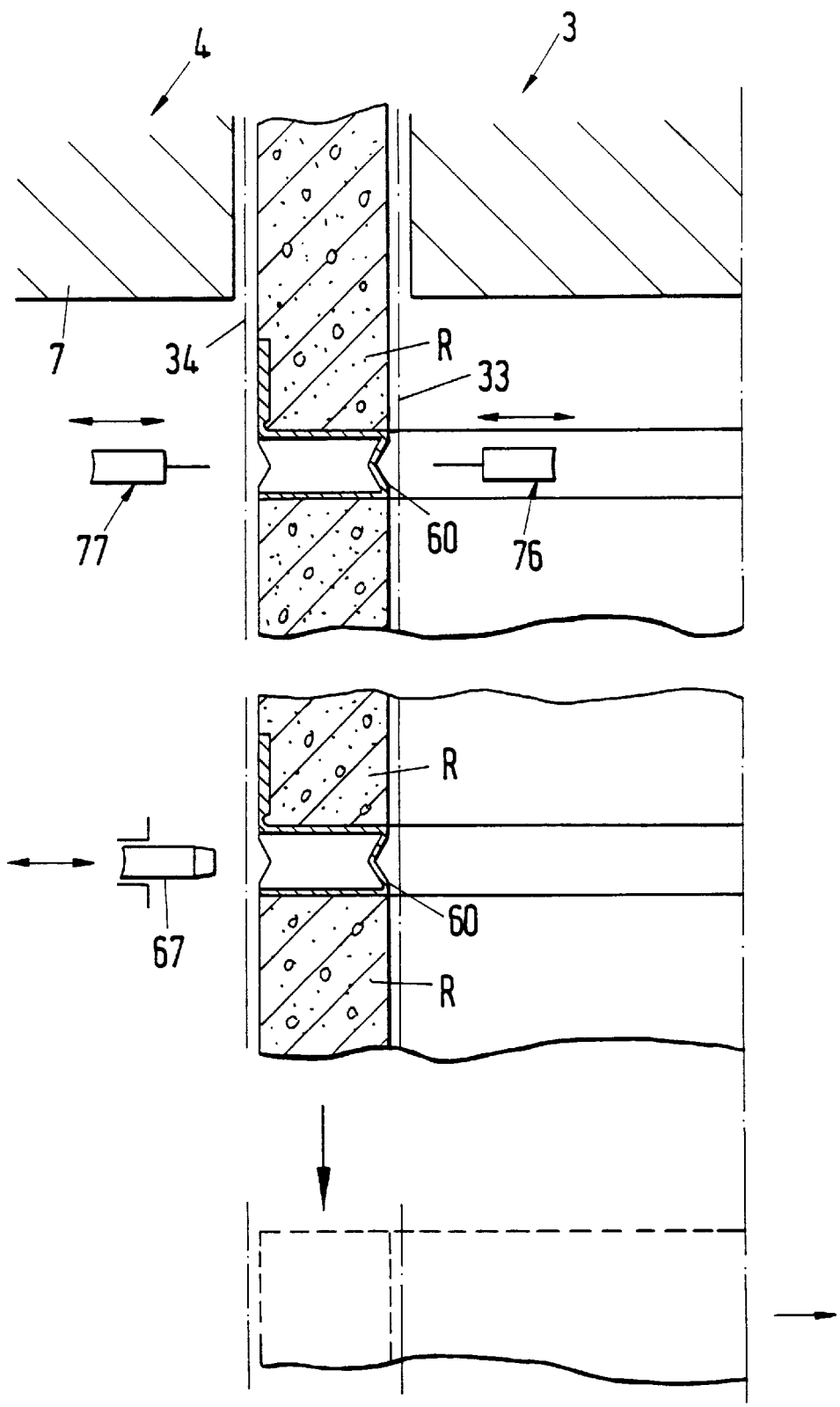
Figure 12:
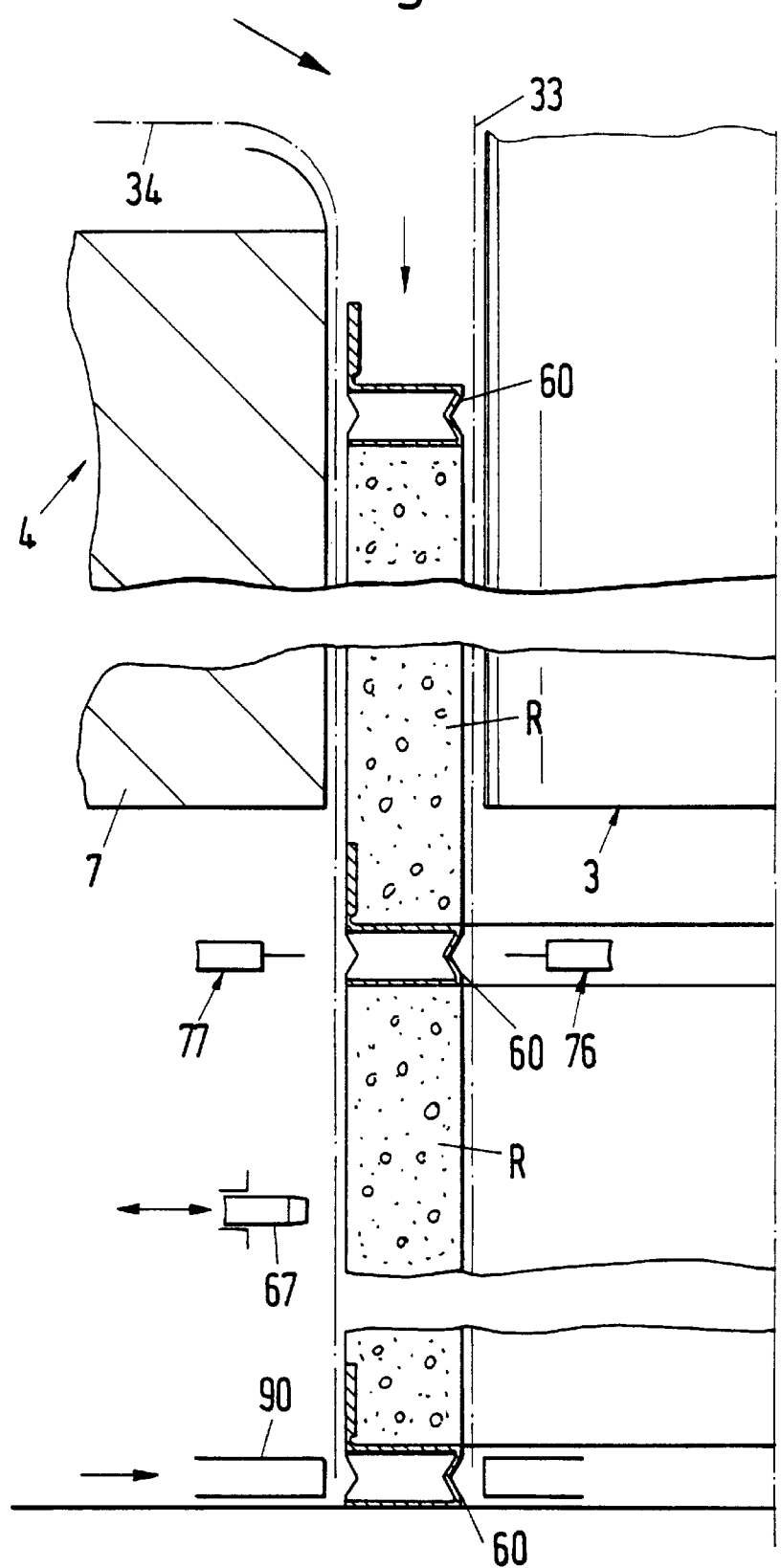
Figure 13:
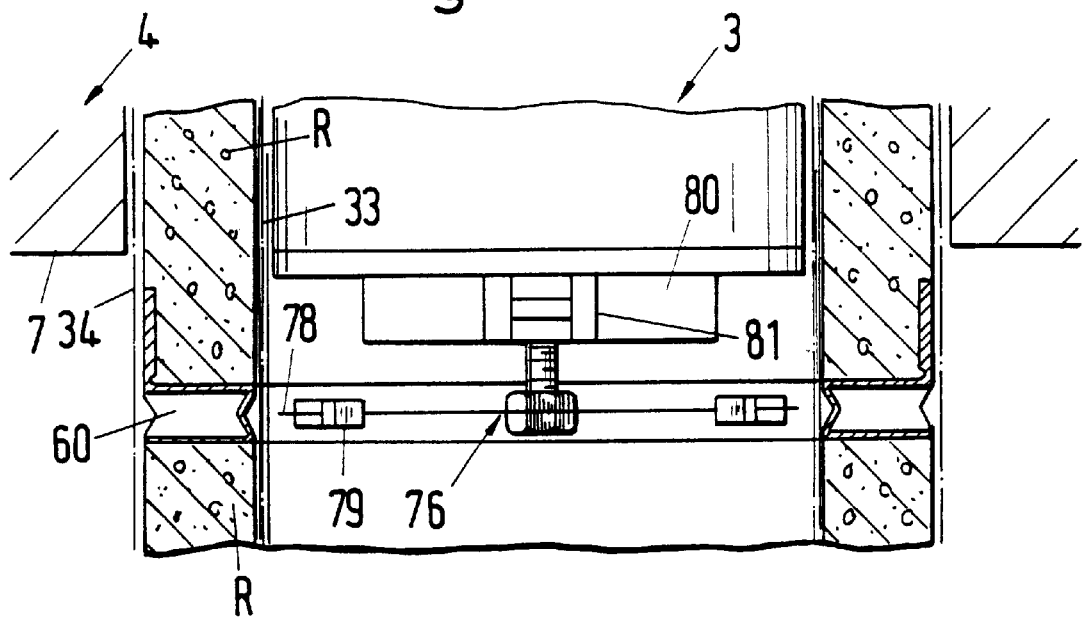
Figure 14:
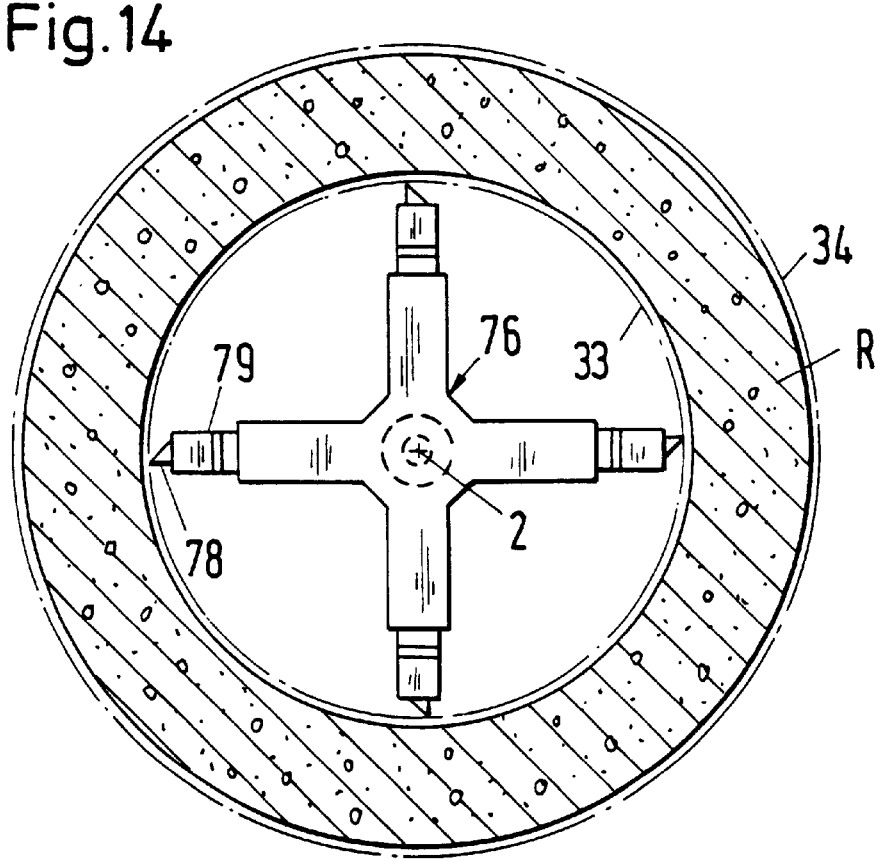
Figure 15:
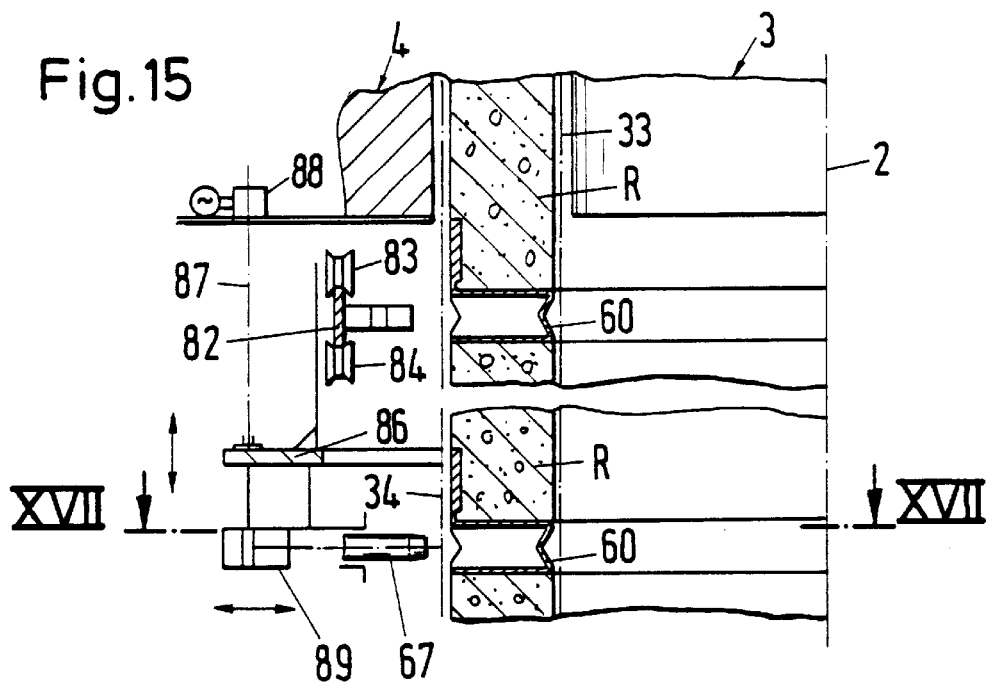
Figure 16:
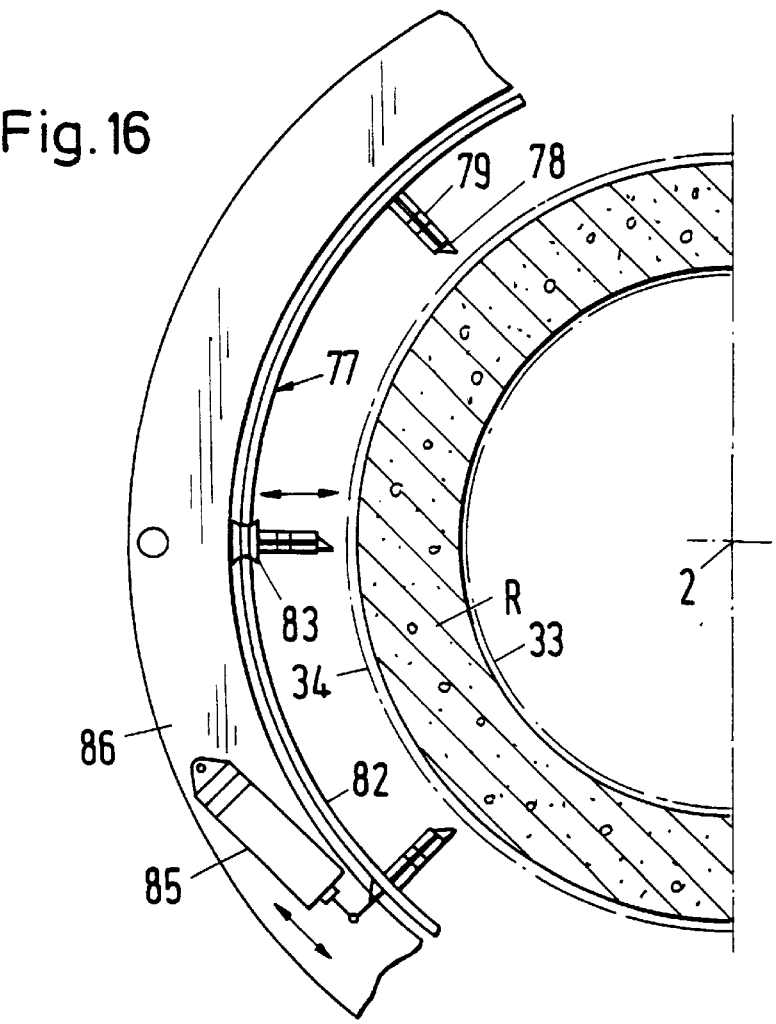
Figure 17:
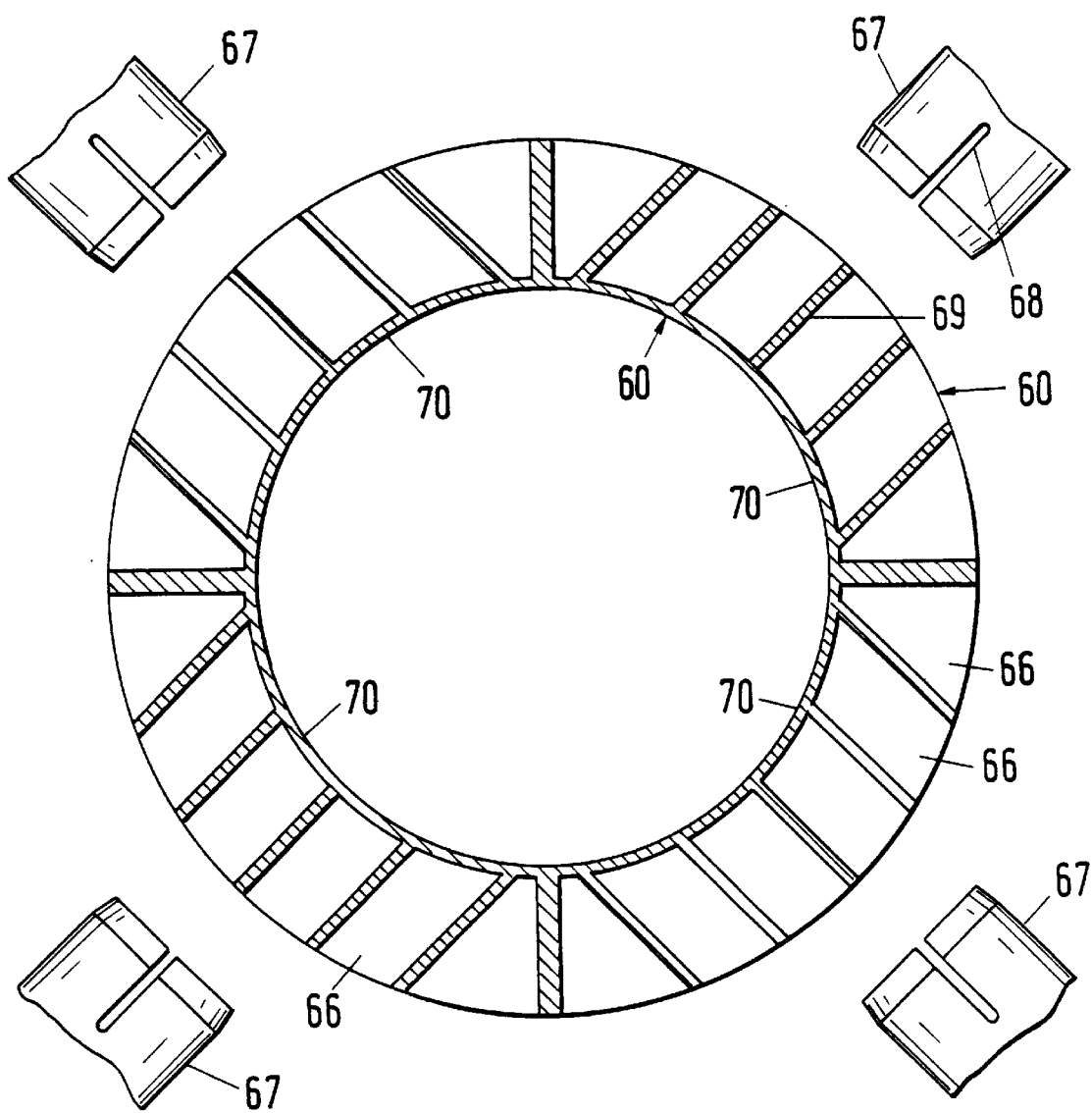
Figure 20:
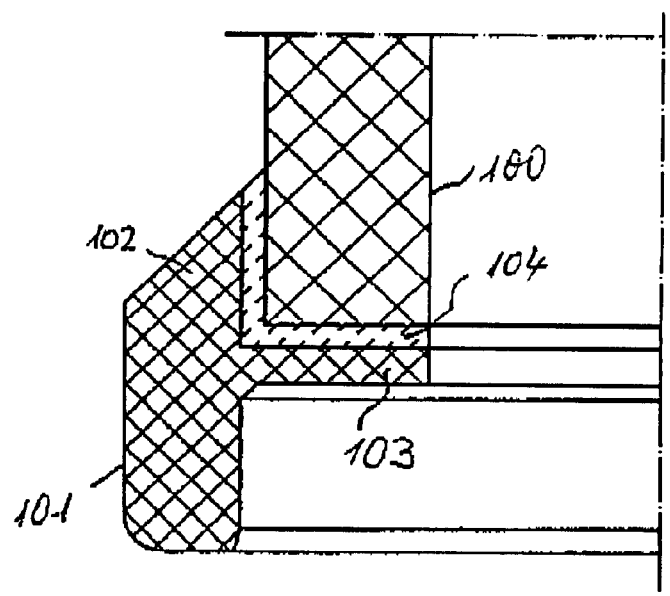
Figure 21:
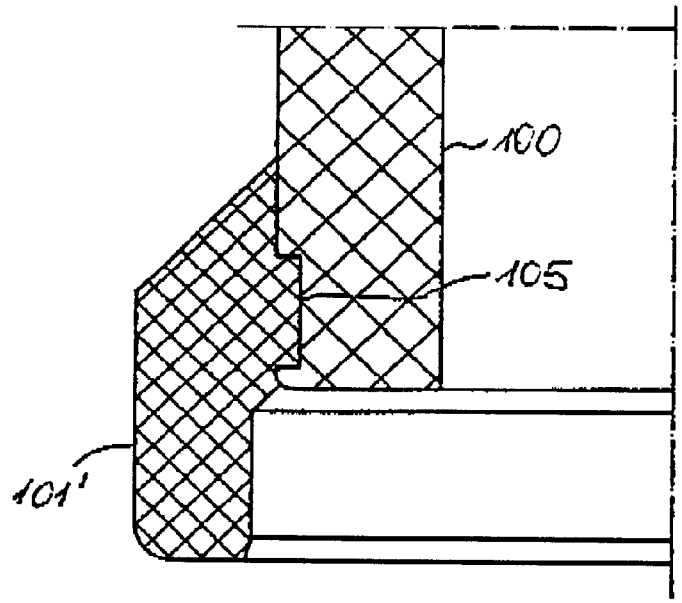
Figure 22:
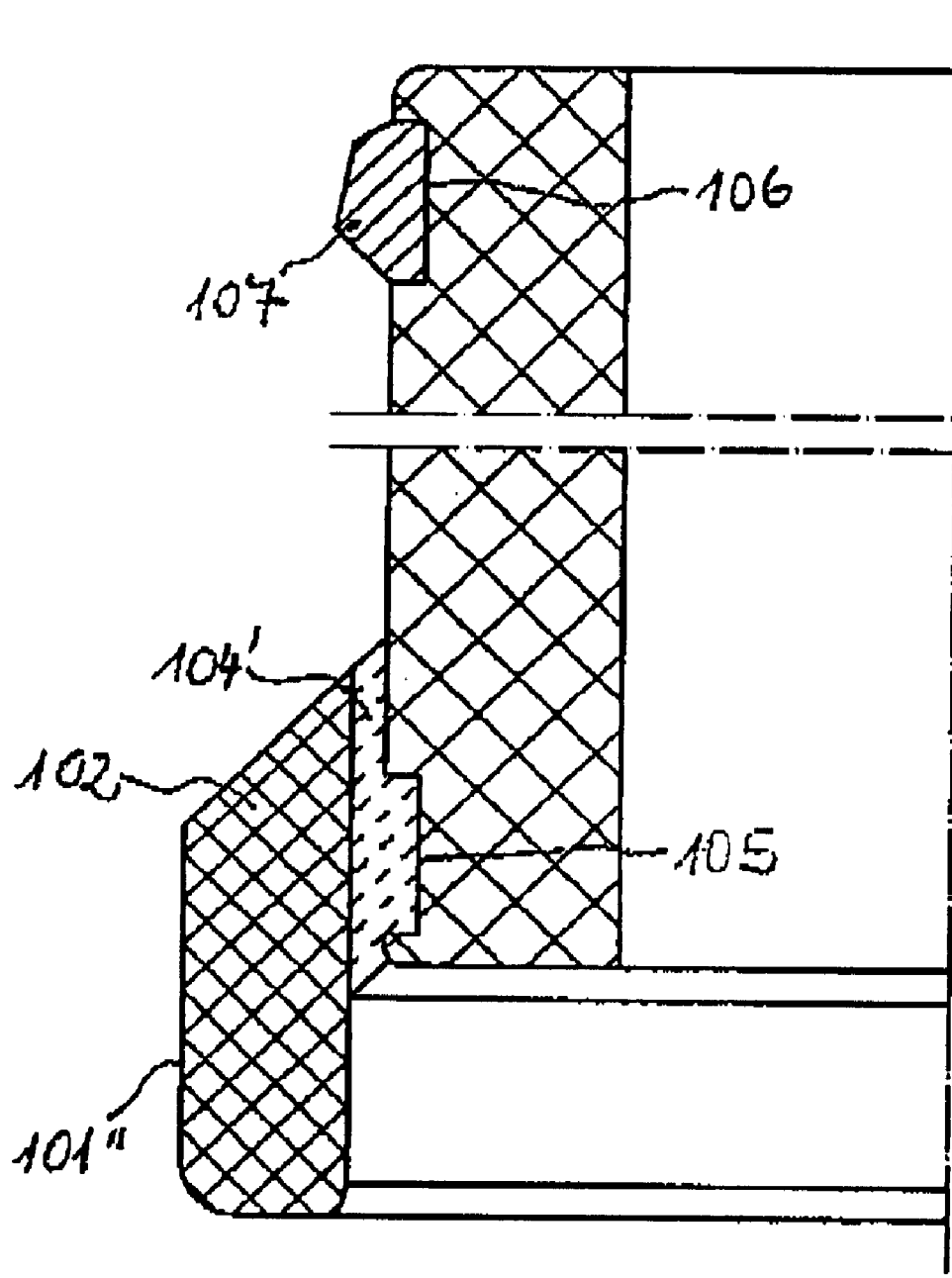

FIG. 1 shows a side view of a first embodiment of the inventive molding equipment, partially in section, in a basic position before the start of the manufacturing process, FIG. 2 shows a side view, half in section, similar to that of FIG. 1 to illustrate parts of an initial phase of the production of the molded body, FIG. 3 shows a side view similar to that of FIG. 1 to illustrate the parts at the conclusion of the manufacturing process of a molded object, FIG. 4 shows a partial, truncated, longitudinal section through a length region of the upper part of the mold casing, FIG. 5 shows a section along the line V—V of FIG. 4, FIG. 6 shows a partial, truncated, longitudinal section, similar to that of FIG. 4, through the lower end of the molding space, FIG. 7 shows a diagrammatic plan view of the closing part with mold segments as inner mold for the socket part, FIG. 8 shows a representation of a further embodiment of the inventive molding equipment, FIG. 9 shows a sectional enlargement of FIG. 8 with a closing body in a starting position at the commencement of the manufacturing process, FIG. 10 shows a representation similar to that of FIG. 8 to illustrate the molding equipment in a later phase of the operation, FIG. 11 shows an enlarged sectional representation of the molding equipment of FIG. 8 to illustrate positions of the molding body in the process of formation while severing the film curtains, during the introduction of the intermediate supporting elements and after assumption of the support by these, FIG. 12 shows a representation similar to that of FIG. 11 to illustrate positions of the molded object in the process of formation in consecutive phases of the continuous production process, FIGS. 13 and 14 show enlarged sectional representations of the molding equipment of FIG. 8 for a more detailed diagrammatic representation of the interior tool of the film-severing equipment in two mutually orthogonal viewing directions, FIGS. 15 and 16 are representations similar to those of FIGS. 13 and 14 to illustrate the exterior tool of the film-severing equipment and its support as well as the support of the intermediate supporting elements, FIG. 17 shows a section along the line XVII—XVII of FIG. 15, FIG. 18 shows a representation similar to that of FIG. 12 to illustrate the position of a finished molded object directly before it is discharged from the molding equipment, FIG. 19 shows a diagrammatic plan view of discharging equipment for finished molded bodies, and FIGS. 20 to 22 show truncated cross-sectional representations of socket pipes in a two-part construction.

DESCRIPTION OF THE PREFERRED EMBODIMENTS

The apparatus, shown in FIGS. 1 to 7, is intended for the production of socket pipes M and comprises, in particular, molding equipment 1 with a vertical, longitudinal central axis 2, which equipment has a mold core 3 and a mold casing 4, as well as filling equipment, 5 for supplying a mineral casting composition into a molding space 6, formed between the mold core 3 and the mold casing 4.

DESCRIPTION OF THE PREFERRED EMBODIMENTS

In the vertical direction, the mold casing 4 comprises a stationary part 7, the inner wall 8 of which forms the outside boundary of the molding space 6 and preferably is constructed cylindrically. For maintenance purposes, it may be possible to divide or dismantle part 7. Under operating conditions, however, part 7 forms a closed structural unit. The axial length of part 7 corresponds to a fraction of the pipe to be produced and may, for example, have the dimensions of 120 cm.

In the case of the example shown, part 7 forms the upper part of the mold casing 4 which, in a plane running perpendicularly to the longitudinal central axis 2, is divided into two parts 7, 9, of which the lower part 9 forms the boundary of the molding space 6 in the region of the socket part of a socket pipe M that is to be produced and, in the axial length, may be limited essentially to the axial length of the socket region. In its axially extending plane, the lower part 9 is divided into two half parts 10, 11, which can be moved by means of driving mechanisms 10a, 11a along diagrammatically indicated guides 12, 13 in opposite directions, horizontally, from a closed operating position (FIGS. 2 and 3) into an opened demolding position (FIG. 1).

For closing off the molding space 6 at the bottom, a closing part 14 is provided, which can be lowered from an upper starting position (FIGS. 1 and 2) into a lower end position by a distance, which corresponds essentially to the nominal length of a molded object to be produced, which in this case is a socket pipe M. In particular, the closing part 14 comprises a ring-shaped supporting panel 15 and an inner mold 16 of the socket part, which is supported on the supporting panel 15.

The lower part 9 of the mold casing 4 is supported on the supporting panel 15 of the closing part 14 and can be lowered together with the closing part 14 from the upper starting position of the latter into the lower end position of the latter, as is illustrated in FIG. 3. In the lower end position of the closing part 14, the half parts 10, 11 of the lower part 9 of the mold casing 4 can be transferred to the final demolding position, as is indicated by the arrows 17, 18, and can be raised in this demolding position together with the closing part 14 into an intermediate position (FIG. 1) at the level of their operating position immediately below the upper part 7, as indicated by arrows 19, 20. From the intermediate position, the half parts 10, 11 can then be moved horizontally in opposite directions inwards into the operating position (FIG. 2) (Arrows 21, 22). For this purpose, the closing part 14 is supported on a lifting table 23, which can be shifted along the vertical guides 24, which can be constructed as threaded spindles and may be driven by means of driving mechanisms indicated diagrammatically at 25.

Preferably, the parts 3, 4, 14 of the molding equipment 1 are mounted so that they can be swiveled as a whole alternately about the longitudinal central axis 2. The swiveling angle may, for example, amount to about 300°. The outlet 5a of the filling equipment 5 is stationary and discharges into the region above the molding space 6, which is open towards the top. This ensures that the molding space 6 is filled uniformly with the mineral casting composition.

Instead of this, it is, however, also conceivable to move the filling equipment 5 or its outlet 5a, when the latter is formed, for example, by a hose, on a circular path in such a manner, that the outlet 5a circles above the molding space 6 about the longitudinal central axis 2 with a sector angle of about 300°.

To insure pivotability about the longitudinal central axis 2, the upper part 7 of the mold casing 4 is supported over a mounting device 5a on a stationary, annular supporting table 27 and the closing part 14 of the mold casing with its supporting panel 15 is supported over a mounting device 28 on the lifting table 23, so that the parts 7 or 9, 14 can be swiveled basically independently about the longitudinal, central axis 2. Diagrammatically shown driving mechanisms 3a, 7a, 9a, however, ensure that the parts 3, 7, 9 and 14 experience synchronous, alternating swiveling. To ensure the swiveling motion of the mold core 3, the latter is supported at a central guiding element 29, which is carried in the region of its upper end by a mounting device 30.

Groups of supply rolls 31, 32 for film strips, which form the mold curtains 33, 34 lining the molding space 6 on the inside and the outside, are assigned to the mold core 3 and the upper part 7 of the mold casing 4. The supply rolls 31, assigned to the mold core 3, are mounted on a supporting frame 35, which is supported at a central guiding element 29 for the mold core 3 and participates accordingly in the alternating swiveling motion of the central guiding element 29 with the mold core 3. The supply rolls 32, assigned to the upper part 7 of the mold casing 4, are mounted at a supporting frame 36, which is supported at an upper part 7, and participate accordingly in the alternating swiveling motion of the upper part 7 of the mold casing 4.

The film strips, which run off from the supply rolls and preferably consist of polyester, may, for example, have a width of 10 cm and overlap in the film curtain 33 or 34 by, for example, about 10 mm. After onset of the mutual overlapping and before they enter the molding space 6, the strips can be connected with one another at the edges, for example by gluing or sealing the edges. Instead of this, it is also possible to form the film curtains in each case from only two film strips or to use a tubular film and to take this tubular film from a storage bin containing tubular film folded in zigzag fashion.

Instead of lining the inside and the outside of the molding space 6 with a film or also in addition to such lining, it is possible to use a lubricant, which can emerge, for example, from delivery openings in the upper edge region of the inner wall of the upper part 7 and from delivery openings in the mold core 3 in a region close to the upper end of the molding space 6 and can coat the axial boundary surface of the molding space 6 with a film in such a manner, that the mineral material composition or the film pass by the boundary surfaces without direct contact. The lubricant can be one which, upon complete curing of the mineral casting composition, becomes a permanent component of the surface or fulfills strictly a lubricating function, when it is used in addition to a film.

In order to fix film curtains 33 and 34 during and between operational processes, annular suction adhesion regions 37, 38, 39 and 40 are provided in each case in the region of the lower edge of the inner wall 8 of the upper part 7 of the mold core 3, of the upper edge of the inner wall of the lower part 9 of the mold core 3, of the lower edge of the outer wall of the mold core 3 and of the rear wall of the inner mold 16 of the socket part of the closing part 14 facing the mold core 3. The suction adhesion regions 37, 38, 39, 40 are formed by chambers 41, which can be connected to a vacuum source and evacuated and are connected over suction openings 42 with the molding space 6.

For severing the film curtains 33, 34 in a plane, which extends at a specified distance below the underside of the upper part 7 of the mold casing 4 and above the upper end of the finished molded object M transversely to the longitudinal central axis 2, film-severing equipment (FIG. 3) is provided, which is indicated diagrammatically at 43 and can have a heatable severing wire, for example, as a severing element.

At its surfaces facing the molding space 6, the inner mold 16 of the socket part of the closing part 14 can have a coating 44, which yields under shrinkage pressure. This coating 44 enables the socket part of the socket pipe M to shrink during the presence of the part 16. In addition to or instead of this, the inner mold 16 of the annular socket part may also be formed by a number of mold segments 45, which are supported from their operating position radially inwards on the supporting panel 15 and can shift radially inwards, for example, against the action of a spring, if they are acted upon by the shrinkage pressure of the curing mineral material composition. In the supporting panel 15, preferably driving mechanisms 16a are provided, by means of which the mold segments 45 of the inner mold 16 of the socket part can be moved between their operating position and an inwardly shifted demolding position, in which they are disengaged from the socket part of the socket pipe M, even when the latter shrinks. In order to offer an essentially closed boundary surface in the operating position and nevertheless to make possible the shifting from the operating position into the demolding position, relatively wide mold parting lines, in which an elastically compressible sealing element 45' is provided, may be provided between the mold segments 45, of which four are preferably provided.

The mold casing 4 can be heated over the whole height of the molding space 6 and, for this purpose, has heating means, which carry out the heating for example, by electrical means, in the walls of its upper and its lower parts 7, 9. The heating can also be accomplished by a liquid or gaseous heating medium, which can be passed through heating ducts 46 in the upper and lower parts 7, 9 of the mold casing 4. Appropriate heating means are also provided in the mold core 3, namely in the region of a heating zone, which can extend practically over the height of the whole of the molding space 6, as in the case of the mold casing 4. Instead of this, it is also possible to provide a heating zone in the mold core 3, which heating zone, in the operating position of the mold core, commences only at a distance below the upper end of the molding space 6 and extends as far as the lower end of the molding space 6.

The mold casing 4 and/or the mold core 3 can have a heating zone 48, which comprises microwave generators 47 as heat generators. The microwave heating zone 48 preferably is assigned to the mold casing 4 in the region of its upper part 7 and, for the heating, is provided additionally with heating means of the previously mentioned type although, in principle, heating exclusively by electromagnetic microwaves is also conceivable.

The mold core 3 has a shaking zone which, at the start of a manufacturing process, initially consolidates the mineral casting composition in the lower part of the molding space adjoining the lower end of the molding space 6 and then, as the level of the mineral casting composition in the molding space 6 rises, is intended to consolidate the mineral casting composition also in upwardly adjoining regions of the molding space and, finally, in that region of the molding space 6, which adjoins the upper end of the molding space 6. This can be brought about in that, in the mold core 3, an axially limited shaking zone is formed, which is level with the lower region of the molding space 6 at the start of the manufacturing process and then, by pulling up the mold core 3, is moved into an upper end position, which adjoins the upper end of the molding space 6 and in which it then remains stationary during the further manufacturing process.

Instead of that, the shaking zone can also extend over the whole height of the molding space 6 and be formed by axially limited partial shaking zones 50, 51, 52, which are disposed one above the other and have vibrators 55, which can be switched on and off independently of one another. The partial shaking zones 50, 51, 52 can, at the same time, each embrace a separate mold core pipe section which, while retaining a joint 54, bridged by an elastic seal, is supported independently at an internal support of the mold core 3 and, in each case, carries its own vibrator 55. The mold core 3 shown has three partial shaking zones 50, 51, 52, which are separated by joints 54 from one another and from the parts of the mold core 3 adjoining above and below. Accordingly, first the partial shaking zone 50, then the partial shaking zone 51 and finally the partial shaking zone 52 can be activated by switching on the vibrator and the active region of the shaking zones can thus be extended in steps from the bottom to the top over the full height of the molding space 6. If the vibrators in the partial shaking zone 50 are switched off after the vibrators in the partial shaking zone 51 are switched on and, if the vibrators in the partial shaking zone 51 are switched off after the vibrators in the partial shaking zone 52 are switched on, then the active region of the shaking zone can also be shifted axially from the bottom to the top.

For producing a film object in the form of a socket pipe M, the half parts 10, 11 of the lower part 9 of the mold casing 4, starting out from the position of the parts in FIG. 1, are initially transferred by a movement in the direction of the arrows 21, 22 into their operating position, in which the suction adhesion region 38 comes to lie opposite to the lower end of the film curtain 34 and fixes this by applying a vacuum.

After that, the mold core 3 is lowered into a position, in which its suction adhesion region 39 lies opposite and is aligned with the suction adhesion region 40 of the closing part 14. In this position of the parts, the suction adhesion region 39 is deactivated and the suction adhesion region 40 activated, so that the film curtain 33 is loosened from the lower end of the mold core 3 and fixed to the closing part 14.

After this preparation of the molding equipment for the production operation, the parts of the equipment are in the position of FIG. 2, in which the molding equipment 1 is then caused to swivel alternately about the longitudinal central axis 2. With or after the onset of this alternating oscillatory movement, the filling equipment 5 is set in operation and mineral casting composition is filled over the outlet 26 into the molding space 6. At this point in time, the heating zones of the mold casing 4 and of the mold core 3 are operating with the result that the boundary walls of the molding space 6 have their specified operating temperature, for example, of the order of 70–100°.

As the filling of the molding space 6 commences, the lowest partial shaking zone 50 of the mold core 3 is started up and the partial shaking zones 51 and 52 are switched on as soon as the level in each case reaches their lower end. With the switching on of the partial shaking zone 51, the shaking in the partial shaking zone 50 can be switched off and, with the switching on of the partial shaking zone 52, the shaking in the partial shaking zone 51 can also be switched off, so that shaking takes place now only in the region of the partial shaking zone 52.

When the nominal upper level in the molding space 6 is reached, the further supply of mineral casting composition, to begin with, is interrupted until, as a result of the heating of the mineral casting composition, the curing process commences in this composition in the region of the lower part 9 and in the lower region of the upper part 7 and leads to a first solidification of the mineral casting composition, which makes it possible to commence now with the lowering of the closing part 14 along with the lower part 9 along the guides 24. With the onset of the lowering process, the column of material in the molding space 6 as a whole commences a downward motion, which is produced by gravity and optionally supported by the pulling action on the film curtains 33, 34 and, with the start of which, the supplying of mineral casting composition by the filling equipment 5 is resumed and metered in such a manner, that the level in the molding space 6 is maintained essentially constant at the scheduled height. As the lowering of the material column in the molding space 6 commences, the heating zone 48 additionally is activated in order to intensify the transfer of heat to the material column in motion and to ensure that, in the mineral casting composition continuously moving downwards in the molding space 6 between the upper part 7 and the mold core 3, a curing process is initiated, which generates in the mineral casting composition, emerging from the upper part 7, already such a strength that the necessary shape maintenance of the molded object M is assured during the further downwards motion.

In general, it is possible to control the shaking and heating while continuously filling the molding space and continuously lowering the column of material in such a manner, that the formation of the molded M object proceeds continually. It is, however, also conceivable to form the molded object M in steps. For example, at the start of the production process, the molding space 6 can be filled very rapidly up to a nominal height and the filling and shaking can be followed by a phase, in which the mineral material composition is merely heated. This can then be followed by a relatively rapid lowering process of the column of material with appropriate maintenance of the nominal state in the molding space 6, until approximately the whole of the preconsolidated part of the column of material is moved out of the molding space in the upper part 7. At this time, the further lowering motion of the parts 9, 14 is interrupted until the column of material, which is in the molding space in the upper part 7 at this time, has acquired the preliminary solidification, required so that it can be discharged from the molding space 6, as a result of the curing process that has been initiated. Subsequently, in a rapid lowering motion, this part of the column of material is once again essentially discharged from the molding space 6 which, while stopped, is filled with more material composition for the next discharging process, until the production of the molded object is concluded.

The question of moving the column of material continuously through the molding space 6 or moving the mineral material composition intermittently depends essentially on the formulation of the mineral casting composition and on the therefrom resulting temperature, at which the curing process is initiated, as well as on the pot life and the curing rate. Preferably, a mineral casting composition is used, which offers an initiating temperature, which is raised above ambient temperature and preferably falls in the range of about 50 to 90° and advantageously between 60 and 70° due to the addition of a curing agent, and which contains a curing accelerator, such as a cobalt accelerator, which shortens the curing process.

If, in the course of the production process conducted in the manner described above, the column of material has reached a length corresponding to the nominal length of the pipe that is to be produced, the further supply of mineral material composition is terminated by switching off the filling equipment 5 and the handling process is continued until the parts essentially have reached the position illustrated in FIG. 3, in which the closing part 14 and the lower part 9 are in their final, lower position. At the same time, the upper end of the socket pipe M produced is at a specified distance below the upper part 7.

For demolding the socket pipe M, the mold core 3 is first moved upwards some distance, until the lower end of the mold core 3 is slightly above the severing plane, which is defined by the equipment 43 and in which the equipment 43 subsequently severs the film curtains 33, 34. Previously, the film curtains 33, 34 were fixed by activating the suction adhesion region 39 of the mold core 3 and the suction adhesion region 37 of the upper part 7. Thereupon, the half parts 10, 11 are moved apart horizontally as indicated by the arrows 17, 18 along the guides 12, 13 into the demolding position. At the same time, the mold segments of the inner mold 16 of the socket part are shifted inwards into their demolding position by means of the driving mechanism 45, so that the socket pipe M, which is still surrounded on the outside and inside by film, can be removed by means of hoisting equipment and taken away for further treatments. Subsequently, the lifting table 23 is shifted upward along the guides 24 in the direction of the arrows 19, 20, until the position of FIG. 1 is reached, starting out from which a new production process can now be commenced.

When pipes are produced with a cross section, which remains the same over the whole length, it is possible to do without the lower part 9 and the closing part 14 can consist essentially of the supporting panel 15 alone. The process can be controlled automatically, programmed on the basis of measurement data, such as the outside temperature of the column of material at a level equal to that of the lower end of the upper part 7, the weight or the volume of the mineral material composition supplied, the level of material in the molding space 6, the position of the closing part on its way to the lower end position, etc. Depending on the length and diameter of the pipes to be produced and on the composition of the mineral casting composition, cycle times of the order of 2 to 4 minutes can be attained.

The second embodiment of inventive mold equipment, illustrated in FIGS. 8 to 19, corresponds largely with that of FIGS. 1 to 7 and identical parts have been given the same reference numbers. Contrary to the mold equipment of FIGS. 1 to 7, the second embodiment of FIGS. 8 to 19 has a mold casing 4, which consists only of the stationary, closed upper part 7. The lower part 9 is not required, since pipes with a constant cross section or with one or two spigots or ends of a similar nature are to be produced with the second embodiment, for which changes in shape lie within the cylindrical contour of the tubular body.

The closing part 14' of the second embodiment has a basically different construction. Admittedly, it also encompasses the supporting panel 15. Primarily, however, it comprises a separator 60, which can be inserted from above into the molding space 6 between the mold casing 4 and the mold core 3 and forms the lower boundary of the molding space 6. As can be seen, for example, in FIGS. 9 and 17, the separator 60 is constructed as an annular part, which molds at least one adjacent end 61 of a molded body R, which is to be formed, into a spigot. For this purpose, the separator 60 is provided with an external annular flange 62, which extends upwards from the upper side 63 of the separator 60 at the outer periphery and, with that, parallel to the adjacent inner wall 8 of the mold casing 4. In the drawing, the annular flange 62 is reproduced only diagrammatically. The exact conformation of its shape is determined by the exterior shape of the pipe end, which is to be formed. If molded bodies R are to be formed with two spigots, the separator 60 can be provided additionally with a ring shoulder (not shown), corresponding to ring shoulder 62 and extending downward.

The separator 60 is provided on the inside and outside with a peripheral indentation 64 or 65 for engagement by film severing elements, which will be dealt with in greater detail below. The separator 60 furthermore has holding pockets 66, which are open to the outside and into which intermediate supporting elements 67, which will be described in greater detail below and can be provided with a vertically aligned central slot 68, can be introduced. As a result of the slots 68, the intermediate supporting elements 67 can be introduced into two holding pockets 66 each and accommodate in their slot 68 a partition 69 between adjacent holding pockets 66.

As can be inferred from FIG. 17, the separator 60 is divided in the vertical direction into several segments 70 (four in the Example shown), which make it possible to assemble the separator 60, for example, with the help of feeding equipment, the details of which are not shown, in a region immediately above the filling opening of the molding space 6 by moving the segments 70 together and then introducing the assembled separator 60 into the molding space 6 from above. Due to the segmented construction, the separator 60 can be detached at the end of the formation of the molded object from the molded object R by pulling off the segment 70 radially.

Below the mold casing 4 and the mold core 3, film-severing equipment 75 with an inner and an outer severing tool 76 and 77 respectively is provided and illustrated in some of the Figures of the drawing only by a line representing the severing plane. However, as shown particularly in FIGS. 13 to 16, each severing tool 76, 77 is provided with a number of radially directed cutting knives 78, which can be moved in each case by means of a diagrammatically illustrated pressure medium cylinder 79, from the neutral position shown radially (outwards or inwards) into an operating position, in which they in each case reach through the cylindrical surface of the film curtains 33 and 34 and protrude into the indentations 64 and 65 respectively of a separator 60, the horizontal central plane of which, when the film-severing equipment 75 is actuated, is level with the severing plane of the film-severing equipment 75.

In the operating position of the cutting knives 78, the severing tools 76, 77 can be swiveled alternatingly about their respective central axis, which coincides with the longitudinal central axis 2 of the molding equipment 1. The swiveling angle is selected so that the cutting knives 78 together pass through an uninterrupted circular arc.

The inner severing tool 76 is fastened to the underside of the mold core 3 and rotatably supported in a bearing part 80 and can be swiveled alternatingly by means of a driving mechanism 81. The outer severing tool 77 comprises an annular support 82, which is guided between upper and lower guide rolls 83, 84 and can be swiveled alternately by means of a pressure medium driving mechanism 85.

The guide rolls 83, 84 are supported on the upper side of an outer supporting ring 86, which is suspended from the underside of the mold casing 4. For this purpose, the outer supporting ring 86 is movably supported at the guides 87 parallel to the longitudinal central axis 2 of the mold equipment 1 and can be moved by means of a driving mechanism 88 between an upper end position and a lower end position. In the case of a particularly simple embodiment, the guides 87 are constructed as threaded spindles, which reach through counterthreads in the outer supporting ring 86 and can be driven uniformly to one another by means of synchronous motors 88, so that the outer supporting ring 86 experiences a precisely parallel shift.

At its underside, the outer supporting ring 86 supports the intermediate holding elements 67, which in each case can be moved by means of a pressure medium driving mechanism 89 from a neutral position radially inwards into engagement with the holding pockets 66 of a separator 60. In this way, the intermediate holding elements 67, of which, for example, four, distributed over the periphery are provided, can be moved up and down for purposes, which will still be discussed further below.

At its upper side, the supporting panel 15 carries fastening jaws 90, which can be moved in each case by means of a pressure medium driving mechanism 91 from a neutral position radially inwards into engagement with the lower end of a molded body R supported on the supporting panel 15 or with the separator 60 surrounding this end, in order to secure the end of the molded body on the supporting panel 15.

For discharging finished molded bodies R from the molding equipment 1, discharging equipment 92, which is located laterally next to the molding equipment 1 in the neutral position, is provided at a height between the supporting panel 15 in its lower end position and the outer supporting ring 86. The discharging equipment 92 has two groups of suction grippers 93, 94, which are disposed mutually above one another, in the initial gripping position lie diametrically opposite to one another and to the molded object R and can be moved by means of a pressure medium driving mechanism 95 from a neutral position radially inwards in opposite directions against the molded object R and can be acted upon with a vacuum by means of a pressure medium source, which is not shown.

The grippers 93, 94 are supported at a frame 96, which can be moved horizontally and makes it possible to bring a finished molded body R, which has been taken hold of, from its position in the molding equipment 1 to a storage area, which can be formed, for example, by a further processing station, a refrigerated room or the like. The movement of the frame 96 can be brought about, for example, with the help of threaded spindles 97, which can be driven by driving motors that are not shown.

For starting up the apparatus, the film curtains 33, 34 are suspended in a molding space 6 and in the molding space 6 and, at the same time, a tubular spacer 98, which is supported on the supporting panel 15 and secured on this with the help of the fastening jaw 90, is introduced from below between the film curtains 33, 34. The separator is then introduced from above into the molding space 6 between the film curtains 33, 34 and placed on the upper end of the spacer 98.

At the start of the process for producing a molded object R, the first separator 60 is in a position relatively closely beneath a specified upper nominal height for the mineral casting composition in the molding space 6, so that, after the introduction of the mineral casting composition by means of the filling equipment 5 is commenced, the specified nominal height is soon reached. At the time at which the charging of the filling space 6 with mineral casting composition is commenced, the parts 3, 4 (including the parts connected with these) are in alternating swinging motion, so that the mineral casting composition is distributed rapidly and uniformly in the molding space 6. Furthermore, at this time, the shaking zone 52 of the mold core 3, adjoining the upper end of the molding space 6, is also already in operation, so that, as soon as the filling of the mineral casting composition is commenced, this composition is shaken in the molding space 6.

When the specified filling level is reached, the lifting table 23 is moved downward. This downward motion is coordinated by the filling equipment 5 with the mineral casting composition supplied in such a manner, that the nominal height is constantly maintained. Above the separator 60, which is lowered with lifting table 23, a column of material is accordingly built up progressively and preferably continuously in the molding space 6 and passes first through the shaking zone 52 and then through a downwardly adjoining heating zone, in which it is exposed to heating, preferably from inside as well as from outside. In the course of the heating, the curing process is initiated. As a result, in a region above the outlet plane of the molding space 6, the molded body R, which is being formed, in each cases reaches a degree of curing, which provides the emerging end of the molded body with such a strength (for example, 20% to 25% of the final strength), that undesired shape changes are excluded.

As soon as the separator 60 reaches the region of action of the film-severing equipment 75, a downward motion is imparted to the outer supporting ring 86, which corresponds to the downward motion of the separator 60, so that there is no relative axial motion between the separator 60 and the cutting knives 78 of the film-severing equipment 75 during the subsequent severing of the film curtains 33, 34. As soon as the film severing process is concluded and the knives 78 have been returned to their neutral position, the outer supporting ring 86 returns to its upper end position, in which at this time the intermediate supporting elements 67, which are still below the separator 60, are located in one plane. As soon as the separator 60, in the course of its steady downwards motion, reaches the region of action of the intermediate supporting elements 67, the outer supporting ring 86 once again commences a synchronous downwards motion, so that the intermediate supporting elements 67 can be introduced into the holding pockets 66 of the separator 60, without there being any relative axial movement between the parts.

As soon as the intermediate supporting elements 67 engage the separator 60, they take over the supporting of the separator 60 and, with that, the supporting of the molded object R resting on it, insofar as this object has already been formed. This makes it possible to move the lifting table 23 and the supporting panel 15 resting on this table downward at an increased rate with the consequence that the spacer 98 is freed from supporting contact with the underside of the separator 60 and that the discharging equipment 92 can commence its activity as soon as the lifting table 23 has reached its lower end position. For taking out the molded object R, the lifting table 23 with the spacer 98 is first of all lifted once again by a short distance, the suction grippers 93, 94 are brought into engagement and the fastening jaws 90 are loosened, after which the lifting table 23 once again is moved down into its lower end position. By these means, the spacer 98 is held by the suction grippers 93, 94 so that it can move freely and can be moved out of the molding equipment 1 with the help of the frame 96.

As soon as the spacer 98 is removed, the lifting table 23 is moved up once again to contact the separator 60. As soon as this contact is made, the upwards movement is converted into downward motion, which is synchronous with the intermediate supporting elements and for which the supporting panel 15 once again can assume the function of supporting the separator 60 and the molded body R above the separator 60. As soon as the fastening jaws 90 have secured the lower end of the molded object R and of the separator 60 on the supporting panel 15, the intermediate supporting elements 67 are moved back into their neutral position, whereupon the outer supporting ring 86 is returned into its upper end position.

As soon as the molded body R, which is being formed, has reached its specified length, which can be determined by measuring the path, determining the weight or in some other suitable manner (photoelectric barrier), the supply of mineral material composition is switched off and a separator 60 is deposited on the upper end of the column of material. After being introduced into the molding space 6, this separator 60 settles under gravity on the upper end of the column of material or can also be placed with the help of pressure elements on the upper end of the column of material. As soon as the new separator 60 is resting on the upper end of the column of material, the supply of mineral casting composition is continued once again and initially carried out on a greater scale, so that shortly, despite the further downward motion of the previously formed molded body R, the column of material of the molded object R, which is to be formed next, once again attains the specified nominal height in the molding space 6. After that, the manufacturing process is continued in the manner already described; after the film curtains 33, 34 are severed and the finished molded object R, which has been removed from the molding space 6, is detached from the separator 66 above this molded body R, the latter is removed from the molding equipment 1 with the help of the discharging equipment 92 as described previously with respect to the spacer 98. The position of the molded body R, which is raised once again at the time, at which the molded body R is removed by the discharging equipment 92, is illustrated in FIG. 18 by phantom lines. At the same time, FIG. 11 illustrates by a phantom line the upper end of the molded object R, moved by the accelerated lowering of the lifting table 23 out of contact with the separator 60 above.

The pipes, produced with the second embodiment of the molding equipment 1, can be used as propulsion pipes or, if formed with spigots at both ends, can be assembled with the help of double sockets into a pipeline. They can, however, also be used as molded blanks for further conversion in a treatment station, in which the ends of the pipes are finished, for example, by machining.

Preferably and pursuant to the invention, molded objects, produced according to the inventive method and with the second embodiment of the molding equipment 1, are used as the main tubular component for the formation of a socket pipe, which consists of this main part and a separately constructed socket part, which surrounds the end of the main part with a connecting region, both parts being connected without a joint in the region of mutually facing surfaces.

FIGS. 20 to 22 show different embodiments of such polymer concrete socket pipes, which are assembled pursuant to the invention, in truncated half sections. For examples, FIG. 20 shows a main part 100 in the region of an end, which is unchanged in cross section and engages a separately produced socket part 101, which surrounds with a connecting region 102 the end of the main part 100. At the same time, the socket part 101 has a peripheral ring land 103, which protrudes radially inwards and the internal diameter of which is identical with the internal diameter of the main part 100. The socket part 101 is dimensioned so that a gap region 104 remains between the mutually opposite surfaces of the main part 100 and of the socket part 101. The gap region 104 is filled with a polymer casting composition as adhesive, which is identical or at least compatible with the polymer component of the polymer concrete and forms an intimate connection.

For the embodiment of the socket pipe of FIG. 21, the socket part 101' is joined to the end of the main part 100 by casting, a solid, joint-free connection also being formed. To increase the strength of the joint, the socket end of the main part 100 can be provided at the outside with a recess 105 which, if necessary, can also be provided for the embodiment of the socket pipe of FIG. 20.

FIG. 22 illustrates an embodiment, for which both ends are constructed as a type of spigot with a recess 105 and 106. In the case of the example shown, the recess serves to accommodate a seal 107. The socket part 101" is shaped particularly simply and can be glued by means of a polymeric compound casting composition in the gap 104' to the socket end of the main part 100. For increasing the strength of the connection, the socket part 101" can also be provided on the inside, in the connecting region 102, with an appropriate recess, which may also be provided in the connecting region 102 of the embodiment of FIG. 20. A polymer concrete composition, which has a slump test value that permits a flow into the joint gap regions 104, 104' can also be used as polymeric casting composition.

What is claimed is:

1. A method for the production of tubular products from a molding material in which said molding material is introduced into a molding space between a mold core and a mold casing which surrounds said mold core and said molding material is supported on a closing part disposed below said mold core and said mold casing, wherein said mold core and mold casing have a longitudinal central axis which is vertically disposed, comprising the steps of:

providing a mold core and a mold casing along with a molding space between said mold core and a mold casing;

providing said mold core and said mold casing each with an axial length which is less than the length of the tubular product to be produced;

introducing said molding material from above said molding space into said molding space to form a column of molding material in said molding space;

shaking said molding material which has been introduced into said molding space;

heating said molding material which has been introduced into said molding space;

commencing curing of said molding material in a lower region of said molding space;

discharging said molding material which has commenced curing from said lower region of said molding space in the form of a discharging column of solidified molding material;

lowering said discharging column of solidified molding material by lowering said closing part relative to said mold core and said mold casing;

passing additional molding material from above said molding space into said molding space;

simultaneously performing said passing step and said discharging step;

shaking said additional molding material in said molding space;

heating said additional molding material in said molding space; and continuing lowering of said column of molding material until said column of molding material is at a height corresponding to a desired longitudinal length of the molded product which is greater than the axial length of said mold core and said mold casing.

2. A method according to claim 1 wherein said passing step comprises passing said molding material into said molding space at a substantially constant rate.

3. A method according to claim 1, wherein said introducing step comprises introducing said molding material into said molding space to a nominal height, said passing step comprising passing said additional molding material into said molding space until said molding material is at a height corresponding to a longitudinal length of said molded product.

4. A method according to claim 1 wherein said introducing step comprises filling a lower part of the molding space with said molding material.

5. A method according to claim 1 further comprising effecting at least one of said shaking and heating steps in respective zones disposed in an axially superimposed relationship on said mold core, disposing said mold core in a lower initial position in which a lower end of said zones is adjacent to a lower end of said molding space, and moving said mold core upwardly relative to said mold casing to an upper position in which an upper end of the zones is adjacent to an upper end of said molding space.

6. A method according to claim 1 further comprising effecting at least one of said shaking and heating steps in respective zones disposed in axially superimposed relationship on said mold core, wherein said zones extend substantially over the height of said molding space, and further comprising activating and deactivating said at least one of said shaking and heating steps in said zones.

7. A method according to claim 1 wherein said closing part forms the lower end of said molding space in an initial position, and wherein, after said curing step has commenced in said molding material in said lower region of said molding space which is disposed adjacent to said closing part, lowering said closing part and said column of solidified molding material parallel to said central axis a distance which enables producing a molded product of a desired longitudinal length.

8. A method according to claim 1 wherein prior to said step of introducing said molding material into said molding space, disposing a separator in the upper region of the molding space such that said separator supports the column of molding material introduced into said molding space during said introducing step, lowering said separator and said column of molding material into a lower region of the molding space, said shaking step comprising shaking said molding material which is supported by said separator, said heating step comprising heating said column of molding material in said lower region of said molding space and thereby commencing curing of said molding material adjacent to said separator, and lowering said separator along with said column of molding material parallel to said central axis a distance which enables producing a molded product of a desired longitudinal length.

9. A method according to claim 1 further comprising rotating said mold casing and said mold core about said central axis while introducing said molding material into said molding space.

10. A method according to claim 1 wherein said heating step includes heating said molding material using electromagnetic microwaves.

11. A method according to claim 1 wherein said molding material commences its initial curing process within a temperature range of 50 to 90 degrees Celsius.

12. A method according to claim 1 further comprising separating said molding material from said mold casing and said mold core utilizing a separating means.

13. A method according to claim 12 wherein said step of separating said molding material from said mold casing and said mold core includes providing sheets of film formed into a curtain along the outside surface of said core mold and along thee inside surface of said mold casing.

14. A method for the production of tubular products from a molding material in which said molding material is introduced into a molding space between a mold core and said molding material is supported on a closing part disposed below said mold core and said mold casing, a mold casing which surrounds said mold core and wherein said mold core and mold casing have a longitudinal central axis which is vertically disposed, comprising the steps of:

providing a mold core and a mold casing each with an axial length which is less than the length of the tubular product to be molded;

introducing said molding material from above said molding space into an upper region of said molding space to form a column of molding material in said molding space;

effecting solidification of said molding material in a lower region of said molding space;

discharging said solidified molding material from said lower region of said molding space in the form of a discharging solidified column of molding material;

lowering said discharging column of solidified molding material by lowering said dosing part relative to said mold core and said mold casing;

passing additional molding material from above said molding space into said upper region of said molding space to continue forming of said column of molding material in said molding space;

continuing to effect solidification of said molding material in said lower region of said molding space; and continuing said discharging step and said lowering step until said column of molding material is at a height corresponding to a desired longitudinal length of the molded product which is greater than the axial length of said mold core and said mold casing.

15. Apparatus for producing tubular molded products from molding material comprising:

a mold casing and a mold core having a common longitudinal central axis which is vertically disposed, said mold casing and mold core being spaced from one another to define a molding space therebetween:

a closing part for supporting said molding material disposed below said mold core and said mold casing;

a supply mechanism for supplying said molding material from above said molding space into said molding space;

a treatment mechanism disposed at treatment zones on said mold core for treating said molding material in said molding space along treatment zones, said treatment mechanism being selected from the group consisting of treating said molding material by shaking said molding material and treating said molding material by heating said molding material;

said mold casing and said mold core each having an axial length which is less than an axial length of the molded product to be produced such that said supply mechanism operates to supply said molding material from above said molding space into said molding space while a column of solidified molding material discharges from a bottom region of said mold casing; and an operable mechanism for lowering a lower end of the column of molding material in a direction parallel to said central axis by lowering said closing part relative to said mold core and said mold casing, said operable mechanism lowering the lower end of the column of molding material from an initial position to a lowered position which enables production of a molded product of a desired longitudinal length greater than the longitudinal length of said mold casing and said mold core.

16. Apparatus according to claim 15 wherein said treatment zones are disposed in axially limited sections on said mold core, and a shifting device for axially shifting said mold core relative to said mold casing to thereby axially shift said treatment zones.

17. Apparatus according to claim 15 further comprising shifting device operable to move said treatment mechanism laterally relative to said mold casing.

18. Apparatus according to claim 15 wherein said mold casing defines the outer boundary of a tubular molded product having a coupling.

19. Apparatus according to claim 15 further comprising a rotatable mechanism for rotating said mold casing about a rotatable axis which is coincident with said central axis, said supply mechanism having a stationary discharge portion which discharges said casting material into said molding space.

20. Apparatus according to claim 15 wherein said mold core includes a central guiding part and a mounting device slidably receiving said central guiding part for guiding axial movement of said mold core along said central axis.

21. Apparatus according to claim 15 wherein said closing part closing off the bottom of said molding space in said initial position, said closing part including an inner mold portion formed into a plurality of mold segments disposed concentrically to said central axis, and an actuating mechanism for moving said mold segments in a radial direction between an operational position and a demolding position.

22. Apparatus according to claim 15 wherein said treatment mechanism comprises a heater on said mold core for heating said molding material in said molding space.

23. Apparatus according to claim 15 wherein said treatment mechanism comprises a heater on said mold core and further comprising a heating device on said mold casing for heating said molding material in said molding space.

24. Apparatus according to claim 15 further comprising jaw means overlying said closing part and movable between a non-engaged and an engaged position, said jaw means engaging said molded product on said closing part when in said engaged position, said jaw means being disengaged from said molded product on said closing part when in said disengaged position.

25. Apparatus according to claim 15 wherein said closing part closes off a lower end of said molding space in said initial position, and drive means for synchronously and alternatively rotating said mold core, said mold casing, and said dosing part.

26. Apparatus according to claim 25 wherein said drive means alternatively rotates said mold core, said mold casing and said closing part about 300 degrees.

27. Apparatus according to claim 15 comprising a heater on said mold casing for heating said molding material in said molding space.

28. Apparatus according to claim 27 wherein said heater comprises a microwave generator.

29. Apparatus according to claim 15 further comprising a film supply mechanism for supplying a film lining to said molding space on an outside of said mold core and an inside of said mold casing.

30. Apparatus according to claim 29 wherein said film supply mechanism include film supply rolls, a carrying frame mounted on said mold core, said film supply rolls being mounted on said carrying frame.

31. Apparatus according to claim 29 wherein said film supply mechanism includes film supply rolls, a carrying frame mounted on an upper part of said mold casing, said film supply rolls being mounted on said carrying frame.

32. Apparatus according to claim 29 wherein said mold casing comprising an upper mold casing part and a lower mold casing part, said upper mold casing part having an inner wall having a lower edge area, said lower mold casing part having an upper edge area, said mold core having an outer wall having a lower edge area, said closing part having an inner mold part having a facing area facing said lower edge area of said mold core, and suction means at each of said respective areas for holding said film at each of said respective areas.

33. Apparatus according to claim 15 further comprising a separator for supporting a lower end of said column of molding material.

34. Apparatus according to claim 33 wherein said separator is in the form of an annular ring which has an upper part which forms one end of a finished molded product into a configuration corresponding to the configuration of said upper part of said annular ring.

35. Apparatus according to claim 33 wherein said separator has pockets which open radially outwardly, and supporting elements operable to be inserted into said pockets.

36. Apparatus according to claim 33 wherein said separator is in the form of a ring which is divided into a plurality of segments along generally vertical planes.

37. Apparatus according to claim 33 wherein said separator comprises a plastic material, said separator having an upper side and an underside provided with vent openings, said separator having outer border edges with sealing lips.

38. Apparatus according to claim 15 further comprising discharging equipment including a gripper means operable to grip the outside of a finished molded product on said closing part and to displace said finished molded product in a horizontal direction.

39. Apparatus according to claim 38 wherein said gripper means includes a first pair of suction grippers disposed one above the other and, a second pair of suction grippers disposed one above the other, said first pair of suction grippers being diametrically opposed to said second pair of suction grippers, and an actuating mechanism for moving said first and second pairs of suction grippers radially between an engaged position and a disengaged position, said first and second pairs of suction grippers engaging said finished molded product on said closing part when in said engaged position, said first and second pairs of suction grippers being disengaged from said finished molded product on said closing part when in said disengaged position, and a vacuum mechanism for supplying a vacuum to said first and second pairs of suction grippers when said first and second pairs of suction grippers are in said engaged position.

40. Apparatus according to claim 39 wherein said discharging equipment further comprises a frame for supporting said actuating mechanism and said suction grippers, and horizontal guides along which said frame is movable horizontally from a take-over position to a delivery position.

41. Apparatus for producing tubular molded products from molding material comprising:
a mold casing and a mold core having a common longitudinal central axis which is vertically disposed, said mold casing and mold core being spaced from one another to define a molding space therebetween;
a supply mechanism for supplying said molding material from above said molding space into said molding space;
a treatment mechanism disposed at treatment zones on said mold core for treating said molding material in said molding space along treatment zones said treatment mechanism being selected from the group consisting of treating said molding material by shaking said molding material and treating said molding material by heating said molding material;
said mold casing having an axial length which is less than an axial length of the molded product to be produced such that said supply mechanism operates to supply said molding material from above said molding space into said molding space while a column of solidified molding material discharges from a bottom region of said mold casing;
an operable mechanism for lowering a lower end of the column of molding material in a direction parallel to said central axis from an initial position to a lowered position which enables production of a molded product of a desired longitudinal length;
a separator for supporting the lower end of said column of molding material; and
a film supply mechanism for supplying a film lining to said molding space on the outside of said mold core and on the inside of said mold casing, said separator having an inside with an indentation and an outside with an indentation, and a severing mechanism for severing said film, said severing mechanism being operable to extend into said indentations.

42. Apparatus for producing tubular molded products from molding material comprising:
a mold casing and a mold core having a common longitudinal central axis which is vertically disposed, said mold casing and mold core being spaced from one another to define a molding space therebetween;
a supply mechanism for supplying said molding material from above said molding space into said molding space;
a treatment mechanism disposed at treatment zones on said mold core for treating said molding material in said molding space along treatment zones said treatment mechanism being selected from the group consisting of treating said molding material by shaking said molding material and treating said molding material by heating said molding material;
said mold casing having an axial length which is less than an axial length of the molded product to be produced such that said supply mechanism operates to supply said molding material from above said molding space into said molding space while a column of solidified molding material discharges from a bottom region of said mold casing;
an operable mechanism for lowering a lower end of the column of molding material in a direction parallel to said central axis from an initial position to a lowered position which enables production of a molded product of a desired longitudinal length;
said mold casing being divided into two half sections by an axial plane which is parallel to said central axis and which includes said central axis;
actuators for moving said two half sections in a direction perpendicular to said central axis between a closed position and an open position and a film supply mechanism for supplying a film to said molding space on an outside of said mold core and on an inside of said mold casing, a film severing device for severing the film below an upper part of said mold casing and below said mold core, said severing device including inner and outer severing knives for severing said film on said outside of said mold core and on said inside of said mold casing along a common horizontal plane.

43. Apparatus according to claim 42 wherein each of said inner and outer severing knives include a driving mechanism for moving each of said inner and outer severing knives in a generally radial direction between a non-cutting position an a cutting position, said severing device including a mounting device mounting said cutting knives for at least partial rotary movement about said central axis.

44. Apparatus according to claim 43 wherein said mounting device mounts said cutting knives of said inner severing device to an underside of said mold core.

45. Apparatus according to claim 43 further comprising a fixed mold structure, said mounting device mounting said cutting knives of said severing device on an outer support ring which is suspended from said fixed mold structure.

46. Apparatus according to claim 45 further comprising a separator operable to support said column of molding material at the bottom of said column of molding material, said separator having pockets which open radially outwardly, a holding mechanism which includes holding elements and actuators for moving said holding elements radially between non-inserted and inserted positions, said holding elements being disposed in said pockets of said separators when said holding elements are in said inserted position, said holding elements being removed from said pockets of said separators when said holding elements are in said non-inserted position, said actuators and holding elements being carried by said support ring.

47. Apparatus according to claim 46 further comprising guides for guiding said support ring for movement parallel to said central axis, and a driving mechanism on said fixed mold structure for moving said support ring along said guides between an upper end position and a lower end position.

48. Apparatus for producing tubular molded products from molding material comprising:
   a mold casing and a mold core having a common longitudinal central axis which is vertically disposed, said mold casing and mold core being spaced from one another to define a molding space therebetween;
   a supply mechanism for supplying said molding material from above said molding space into said molding space;
   said mold casing being divided into an upper mold casing part and a lower mold casing part by a plane disposed perpendicular to said central axis, said upper and lower mold casing parts being juxtaposed to one another in an upper start position;
   said lower mold casing part being divided into two half sections by an axial plane which is parallel to said central axis and which includes said central axis, actuators for moving said two half sections in a direction perpendicular to said central axis between a closed position and an open position;
   an operating mechanism for lowering said lower mold casing part from said start position to a lower position where said upper and lower mold casing parts are spaced from one another;
   a treatment mechanism for treating said molding material in said molding space, said treatment mechanism being selected from the group consisting of shaking said molding material and heating said molding material, said treatment mechanism being operable to effect solidification of the molding material in said lower mold casing part and in a lower region of said upper mold casing part;
   said upper mold casing part and said mold core each having an axial length which is less than an axial length of the molded product to be produced;
   said operable mechanism lowering said lower mold casing part from said start position to said lower position as said solidified molding material in said lower region of said upper mold casing part discharges from said lower region of said upper mold casing part to thereby enable production of a solidified molded product of a desired longitudinal length; and
   a film supply mechanism for supplying a film to said molding space on an outside of said mold core and on an inside of said mold casing, a film severing device for severing the film below an upper part of said mold casing and below said mold core said severing device including inner and outer severing knives for severing said film on said outside of said mold core and on said inside of said mold casing along a common horizontal plane.

49. Apparatus for producing tubular molded products from molding material comprising:
   a mold casing and a mold core having a common longitudinal central axis which is vertically disposed, said mold casing and mold core being spaced from one another to define a molding space therebetween;
   a support member for supporting said molding material disposed below said mold core and said mold casing;
   a supply mechanism for supplying said molding material from above said molding space into said molding space;
   said mold casing having an upper mold casing part and a lower mold casing part, said upper and lower mold casing parts being juxtaposed to one another in an upper start position;
   an operating mechanism for lowering said lower mold casing part and said support member relative to said upper mold casing part and said mold core from said start position to a lower position where said upper and lower mold casing parts are spaced from one another;
   a treatment mechanism for treating said molding material in said molding space, said treatment mechanism being selected from the group consisting of shaking said molding material and heating said molding material, said treatment mechanism being operable to effect solidification of the molding material in said lower mold casing part and in a lower region of said upper mold casing part;
   said upper mold casing part and said mold core each having an axial length which is less than an axial length of the molded product to be produced;
   said operable mechanism lowering said lower mold casing part and said support member from said start position to said lower position as said solidified molding material in said lower region of said upper mold casing part discharges from said lower region of said upper mold casing part to thereby enable production of a solidified molded product of a desired longitudinal length greater than the longitudinal length of said upper mold casing part and said mold core.

50. Apparatus according to claim 49 wherein said lower mold casing is divided into two half sections by an axial plane which is parallel to said central axis and which includes said central axis, and actuators for moving said two half sections in a direction perpendicular to said central axis between a closed position and an open position.

51. Apparatus according to claim 50 wherein said upper mold casing part is supported on a mounting device, and a rotary mechanism rotatably supporting said mounting device for effecting rotary movement of said upper mold casing part about said central axis.

52. Apparatus according to claim 50, further comprising a film supply mechanism for supplying a film to said molding space on an outside of said mold core and on an inside of said upper and lower mold casing parts, severing means for severing said film along a cutting plane extending transversely to said central axis, said cutting plane being disposed in spaced relationship below an underside of said upper mold casing part and above an upper end of a finished molded object.

53. Apparatus according to claim 50 wherein said support member further supports said lower mold casing part.

54. Apparatus according to claim 53 wherein said actuators move said two half sections into said open position when said lower mold casing part is in its lower position, said operating mechanism being operable to raise said support member and said lower mold casing part from said lower position to an intermediate position while said two half sections are in said open position, said intermediate position being at a same level as said start position.

55. Apparatus according to claim 53 wherein said operable mechanism further comprises a lifting table on which said support member is supported, vertical guides guiding said lifting table for vertical movement, and a mounting device for mounting said support table on said lifting table for rotatable movement about said central axis.

* * * * *